Dec. 8, 1959 J. SOBISCH ET AL 2,915,962

RECORD-CARD CONVEYING APPARATUS IN ACCOUNTING MACHINES

Filed April 8, 1957 13 Sheets-Sheet 1

Inventors
JOHANNES SOBISCH
AUGUST KRÜGER

RECORD-CARD CONVEYING APPARATUS IN ACCOUNTING MACHINES

Filed April 8, 1957 13 Sheets-Sheet 2

Inventors
JOHANNES SOBISCH
AUGUST KRÜGER

Dec. 8, 1959 J. SOBISCH ET AL 2,915,962

RECORD-CARD CONVEYING APPARATUS IN ACCOUNTING MACHINES

Filed April 8, 1957 13 Sheets-Sheet 3

Inventors
JOHANNES SOBISCH
AUGUST KRÜGER

RECORD-CARD CONVEYING APPARATUS IN ACCOUNTING MACHINES

Filed April 8, 1957 13 Sheets-Sheet 4

Inventors
JOHANNES SOBISCH
AUGUST KRÜGER

RECORD-CARD CONVEYING APPARATUS IN ACCOUNTING MACHINES

Filed April 8, 1957 13 Sheets-Sheet 5

Inventors
JOHANNES SOBISCH
AUGUST KRÜGER

RECORD-CARD CONVEYING APPARATUS IN ACCOUNTING MACHINES

Inventors
JOHANNES SOBISCH
AUGUST KRÜGER

RECORD-CARD CONVEYING APPARATUS IN ACCOUNTING MACHINES

Filed April 8, 1957 13 Sheets-Sheet 7

Inventors
JOHANNES SOBISCH
AUGUST KRÜGER

Dec. 8, 1959 J. SOBISCH ET AL 2,915,962

RECORD-CARD CONVEYING APPARATUS IN ACCOUNTING MACHINES

Filed April 8, 1957 13 Sheets-Sheet 8

Inventors
Johannes Sobisch
August Krüger

RECORD-CARD CONVEYING APPARATUS IN ACCOUNTING MACHINES

Filed April 8, 1957 13 Sheets-Sheet 9

Inventors
JOHANNES SOBISCH
AUGUST KRÜGER

RECORD-CARD CONVEYING APPARATUS IN ACCOUNTING MACHINES

Inventors
JOHANNES SOBISCH
AUGUST KRÜGER

RECORD-CARD CONVEYING APPARATUS IN ACCOUNTING MACHINES

Inventors
JOHANNES SOBISCH
AUGUST KRÜGER

RECORD-CARD CONVEYING APPARATUS IN ACCOUNTING MACHINES

Inventors
JOHANNES SOBISCH
AUGUST KRÜGER

Dec. 8, 1959 J. SOBISCH ET AL 2,915,962

RECORD-CARD CONVEYING APPARATUS IN ACCOUNTING MACHINES

Filed April 8, 1957 13 Sheets-Sheet 13

Inventors:
JOHANNES SOBISCH
AUGUST KRÜGER

United States Patent Office 2,915,962
Patented Dec. 8, 1959

2,915,962

RECORD-CARD CONVEYING APPARATUS IN ACCOUNTING MACHINES

Johannes Sobisch and August Krüger, Bielefeld, Germany, assignors to Anker-Werke Aktiengesellschaft, Bielefeld, Germany Application April 8, 1957, Serial No. 651,381

Claims priority, application Germany April 28, 1956

19 Claims. (Cl. 101—19)

Our invention relates to accounting machines for operation with data-carrying account cards which, in contrast to single-transaction cards of known bookkeeping systems, afford a line-for-line continuance of an account whose individual transactions and changes are legible from respective printed entries and whose last entry always exhibits the current balance of the account by scannable code marks as well as in print.

Such machines comprise a value posting device in the form of a manually operable keyboard, a sensing apparatus for scanning the code marks that denote values and control intelligence on the cards and for transferring the sensed-off information into the machine, computing devices for calculating results from the posted and scanned values, marking and printing devices which record the accounting data upon the account card by scannable marks and by printed entries and which also serve for the production of journals, statements of account and the like legible records of successive bookkeeping transactions.

The machines are further equipped with control or programming apparatus for controlling and properly coordinating the desired functioning of the afore-mentioned sub-systems. The control apparatus in this type of accounting machine "calls," or "occupies," the various coactive sub-systems in the desired sequence by means of electric impulses and supervises the correct system performance, thus automizing the accounting operation and preventing the occurrence of transferring errors. The automatic control of the machine thus not only combines and correlates the operations of the individual sub-systems to secure the desired overall machine performance, but it also suppresses certain partial functions of the subsystems in dependence upon computed results, or enters other, normally not effective, partial performances into the "called" machine operation, thus enforcing an accurate time coordination of the various component operations occurring during an accounting run.

As mentioned, a machine of this type operates with punched account cards capable of recording a multiplicity of individual transactions as they may occur in the particular business account to which the card is assigned. When a new buiness transaction is to be entered on such a card together with the computed new balance, the proper account card is placed upon a lay-on surface from which it is automatically conveyed, successively during the course of a machine operation, to the scanning apparatus, the computing devices and the marking or printing devices. Since such an account card, containing the entire accounting history of the account, is much larger than a single-transaction card and since the account card, in accordance with its memorizing character, is subjected in the machine to a multiplicity of component accounting operations, extremely exacting requirements must be met by the conveying means that transfer such account cards from the lay-on location to the scanning, printing and punching locations within the machine, and ultimately to the location where the card, after complete processing, is again issued from the machine. For that reason, it is preferable to have such an account card inserted into a card carriage upon which the card travels, under control by the programming equipment of the machine, to such a position that the last previous line of entries is properly positioned beneath the scanning elements of the machine.

For determining the length of the conveying travel required for this purpose, a line finder device is used which responds by means of feeler elements to all entered lines of scannable marks and thereby selects the proper stopping point for the travelling card carriage. After scanning the old balance off the card, the card carriage continues its travel and moves the inserted account card so that its next vacant line is placed beneath the printing and punching devices of the machine. The necessary length of further travel, however, is larger than the spacing beneath two neighboring entry lines of the account card because due to the space requirements of the printing and punching mechanisms, they cannot be located at the place of the scanning apparatus.

In a known machine of the above-mentioned type, the printing and punching mechanisms for marking the account card are arranged side by side on a single line so that after locating the last entered line, the card carriage is moved in the same travelling direction under control by relatively simple control means into the new, still vacant accounting line, this travelling direction being the same as the one obtaining when the card was previously transferred to the last previously entered line. After completing the accounting operation, the card carriage is returned to its starting position and the account card is removed from the carriage.

This arrangement of the printing and punching mechanisms has various disadvantages. In the first place, the entire width of the account card cannot be subjected to the operation of the printing or the punching mechanism without requiring lateral displacement of the card carriage. Furthermore, it is necessary to give the printing mechanism a very compact design and to have the individual printing type members placed sequentially into the printing position, thus requiring a printing device of relatively slow operation. If an attempt is made to avoid the use of separate control devices for the punching and printing mechanisms respectively, then it would also be necessary to enter the scannable marks in decimal steps into the account card which would require considerable time for marking the account card. Besides, the necessity for movement of the card carriage in the line direction and typing direction requires great structural expenditure and excessively much space.

These disadvantages are avoided if a printing mechanism is used which occupies the entire width of the account card and simultaneously imprints all types previously placed into printing position, and if together with such a printing mechanism a punching mechanism is used which likewise occupies the entire width of the account card and is capable of placing all selected punching plungers simultaneously into active position. Since printing and punching mechanisms of such a design can only be located one behind the other with reference to the account card, the scanning, printing and punching mechanisms in such a machine are now located at three different line positions of the account card, and the card carriage for conveying the account card, after having been placed into the scanning position, must subsequently be moved successively to the printing position and to the punching position. The first portion of the conveying travel, which places the account card under control by the line finding device so that the last entered accounting line is located beneath the sensing mechanism of the machine, can be carried out in a relatively simple manner.

However, the subsequent transfer of the account card with its new accounting line into the printing position and into the punching position is difficult because of the successively located printing and punching mechanisms. These difficulties are particularly pronounced if the printing and punching mechanisms, for space-saving purposes and in accordance with their own respective design and operation, are disposed in a sequence that does not correspond to the sequence of their respective operations in the course of an accounting run.

Furthermore, the time sequence of the different partial conveying movements of the account card is different for different machine operations. That is, any types of accounting that depart from normal require a card-carriage travel different from that of normal accounting. Thus, for example, multiple-item accounting requires a plurality of line shifts of the card in the printing position, before the account card is passed into the punching position. A further example is the staggered calculation of amounts of interest. For such calculation, the account card, after having passed through the accounting runs, must be capable of issuing the entered values and other data, represented by punched holes or other markings in any desired line position, to the scanning elements of the accounting machine.

Such different modes of card-carriage travel can no longer be exclusively controlled by a line finder device responsive to the last-entered line, because, although the amounts of travel to the scanning and printing mechanism or to the printing and punching mechanism are constant, the starting points for these amounts of travel are displaced continually with respect to the available total amount of conveying travel. Besides, a high speed of card-carriage travel to the respective scanning and marking positions of the machine is desired in order to permit fully utilizing the high operating speed of which the scanning, calculating, punching and other mechanisms are capable, and hence to result in smallest possible duration of a complete accounting run.

Relating to accounting machines, particularly punched-card machines, of the above-mentioned type, wherein a card carriage conveys the account card from a lay-on place through the various processing stations within the machine before discarding it back to the outside, it is an object of our invention to obviate the above-mentioned deficiencies heretofore encountered. More specifically, our invention aims at providing a machine whose card-conveying means combine a more compact design with the ability of accurately transferring the card to any desired variety of processing positions over any desired length of travel, while reliably operating at great speed so as to permit taking full advantage of the best obtainable operating speeds of the scanning, calculating and other component sub-assemblies of the machine, thus minimizing the time required for a complete accounting run.

To achieve these ends, and in accordance with a feature of our invention, we equip the machine with drive means which move the card carriage in opposite directions to, and between, the successively located scanning, punching and printing mechanisms of the machine; and we also provide a stopping device which coacts with the card carriage in dependence upon the desired machine performance or program and which subdivides the total conveying travel of the carriage in each of the two travelling directions into travel portions of selective length so that the account card on the carriage is automatically moved away from its starting position as well as from any line position into the desired vacant-line position or into any desired entered-data position relative to the respective scanning, punching and printing mechanisms.

Another, subsidiary object of the invention is to secure, despite the great conveying speed, a safe and reliable stopping of the carriage by means of electromagnets that control the carriage travel. According to another feature of our invention, therefore, we provide the control magnets with an impulse-prolonging electric circuit in conjunction with a rack device equipped with special rack-gear teeth.

According to still another feature of the invention we provide the machine with a card-carriage selector which is driven in synchronism with the carriage travel and is interwired with the carriage control device in order to impose a controlling effect upon the course of the program-controlled machine performance.

According to a further feature, a line finder device, cooperating with the card-carriage control device, serves for rapidly determining the last-entered line of the account card being processed, and means are provided for suppressing the functioning of the line finder device in accordance with a desired program performance.

The foregoing and more specific objects, advantages and features of our invention, these features being set forth with particularity in the claims annexed hereto, will be apparent from, and will be mentioned in, the following description relating to the embodiment of an accounting machine according to the invention illustrated by way of example on the accompanying drawings in which:

*General introductory description*

Figure 1:
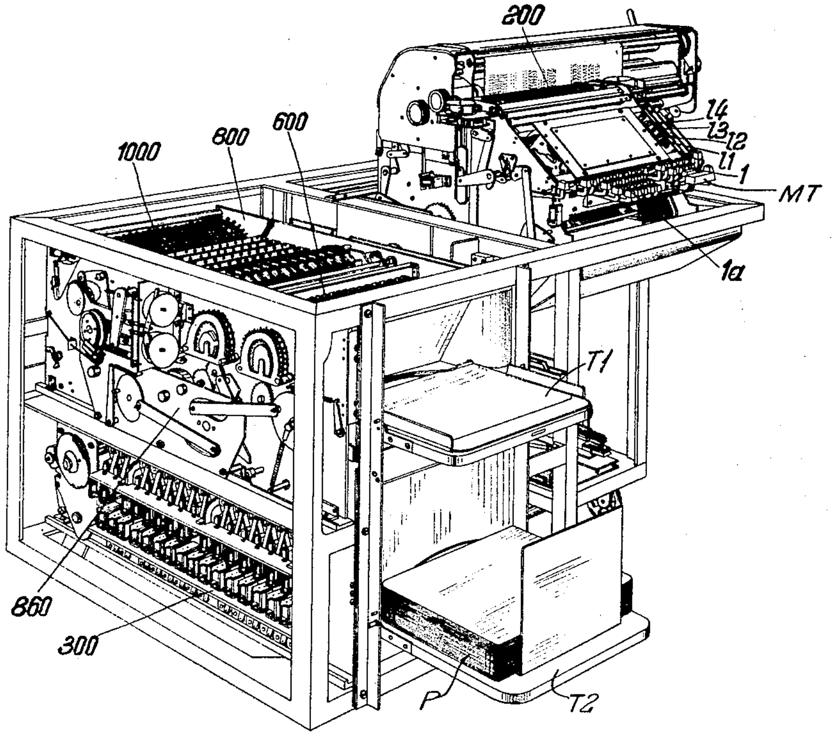
Fig. 1 is a schematic perspective view of the complete accounting machine, some of the side walls being removed in order to show part of the interior.

The embodiment of an account-card carriage control system hereinafter described is illustrated in Fig. 1 as one of the sub-assemblies of a punched-card accounting machine of known general type and, as here exemplified, possesses scanning and controlling devices of mechanical type. It will be understood, however, that electrical or electronic scanning and control means may be used, such as magnetic or photo-electrical scanners or marking devices.

The punched-card accounting machine illustrated in Fig. 1 comprises the following main apparatus groups: (1) a computer assembly 300, (2) a scanning and punching assembly 600 for scanning intelligence from the account cards and entering new coded data in form of punched holes upon the cards, (3) a card printer assembly ("lower printer") 800, (4) a card-carriage control assembly 860, (5) a journal printer assembly ("upper printer") 200, (6) a keyboard 1 designed as a ten-keyboard for the posting of computing values, (7) an alphabetical-numerical keyboard 1*a* generally similar to that of a typewriter with keys for selectively "calling" the computer mechanisms and for the posting of monitoring symbols and the like, and (8) a programming assembly 1000 for selectively monitoring the cooperation of the above-mentioned other sub-assemblies. For facilitating service and supervision, the machine is provided with signal lamps $l_1$ to $l_4$ which indicate to the operating person whether the machine is ready for the next following accounting operation. The mechanisms of the sensing and punching assembly 600, the mechanics of the card- and journal-printing assemblies 200, 800 and of the keyboards 1 and 1*a* are largely conventional and, since their particular details are not essential to the invention, are illustrated and described only to the extent necessary for understanding the features and operation of the card-carriage control assembly 860 and its connection and coaction with the other sub-assemblies of the machine.

Before describing the machine in detail, it will be helpful to briefly consider an example of an accounting operation to be performed. Assume that a current business transaction is to be registered. The operator places the account card, showing the past history of the particular account in legible form as well as by scannable code marks, upon a card receiving table T1 (Fig. 1). The operator further posts into the machine, by means of the keyboards 1*a* and 1, the identifying number or symbols of this particular account as well as the data of the new transaction. When the machine is thus set up, the operator depresses a motor key MT of the keyboard assembly. This puts the machine into operation for the accounting run. Now, the card is automatically conveyed from table T1 into the interior of the machine where a card carriage successively conveys the card to different localities where the individual machine operations, namely scanning, printing and punching, are to be performed. The machine then computes the data of the new transaction together with the old balance data of the account and automatically enters the accounting result on the card in print and also by punching a new hole combination. Simultaneously, the machine prints a legible record of the accounting result into the proper columns of a journal sheet or other record in the upper printer assembly 200. Upon completion of the accounting operation, the card is ejected onto another table or support T2 (Fig. 1) where, after completion of a number of successive accounting operations, a pile of cards P is collected as shown in Fig. 1.

Figure 10:
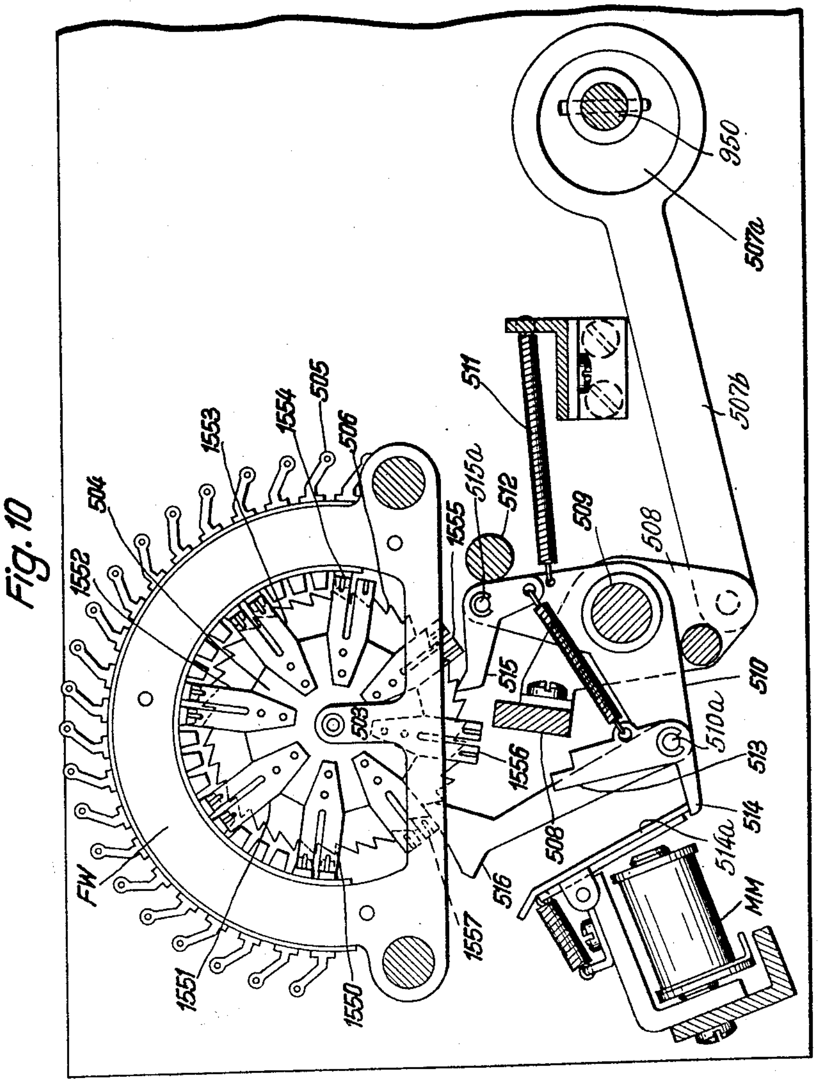
Fig. 10 is a side view of a monitoring switch which forms part of the programming assembly of the machine.

The main power supply of the machine comprises an electric motor MD (Fig. 12), which is connected to an alternating-current line under control by a main switch HS. Switch HS is closed, and motor MD is kept running at constant speed as long as the machine is in condition of readiness. Thus, the main drive shaft 950 (Figs. 6, 10) of the machine, driven by motor MD, revolves continuously. This main shaft supplies power to the main control shafts of the individual sub-assemblies under control by respective single-turn clutches described below.

The main power supply of the machine also comprises a source of electric control current, preferably direct current. This source is exemplified by a rectifier, schematically shown at G in Fig. 12, which is also connected to the alternating-current supply line. The positive and negative output poles of the current source are denoted by + and − respectively, and it is to be understood that these two poles are connected by buses (not illustrated) with all leads designated by + and −, respectively, in the circuit diagrams of Figs. 11 and 12.

*Single-turn clutches*

As mentioned, the individual sub-assemblies of the machine are selectively driven from the main shaft under control by respective single-turn clutches. Each of these clutches, when put into action, imparts a single complete rotation to the main control shaft of the sub-assembly. Such a single cycle of rotation is initiated by a starting pulse which acts upon a switching magnet of the clutch; and each sub-assembly, when completing an individual run, issues a stop-signal pulse for initiating some other machine operation. The start pulses for the clutch switching magnets are issued by the program switching assembly 1000 (Fig. 1) in cooperation with selectively operable motor keys such as the one denoted by MT (Figs. 1, 2, 12), and these pulses occur in a given sequence depending upon the selected control program.

Figure 5:
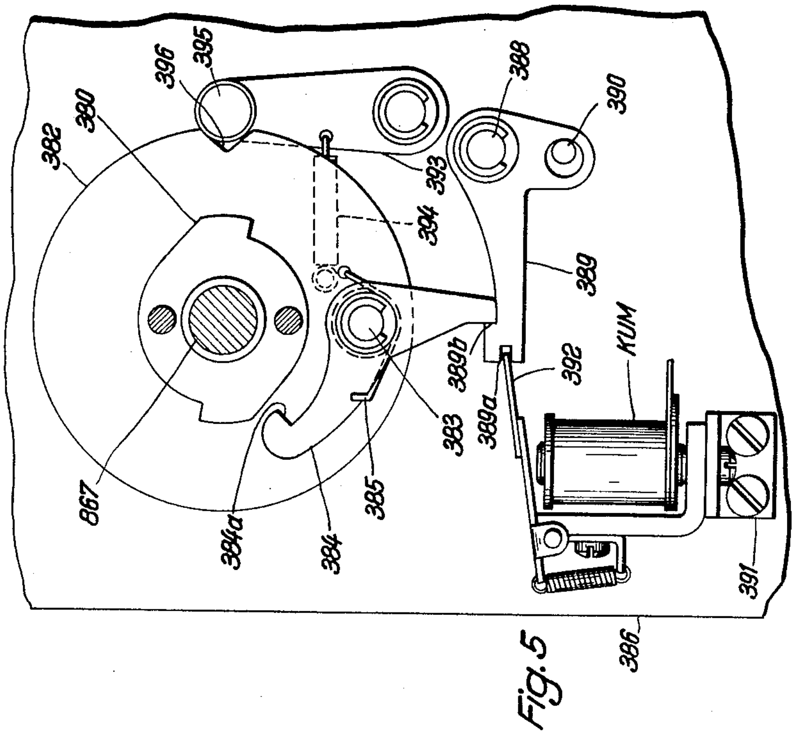
Fig. 5 is a front view of the single-turn clutch according to Fig. 4.
Figure 4:
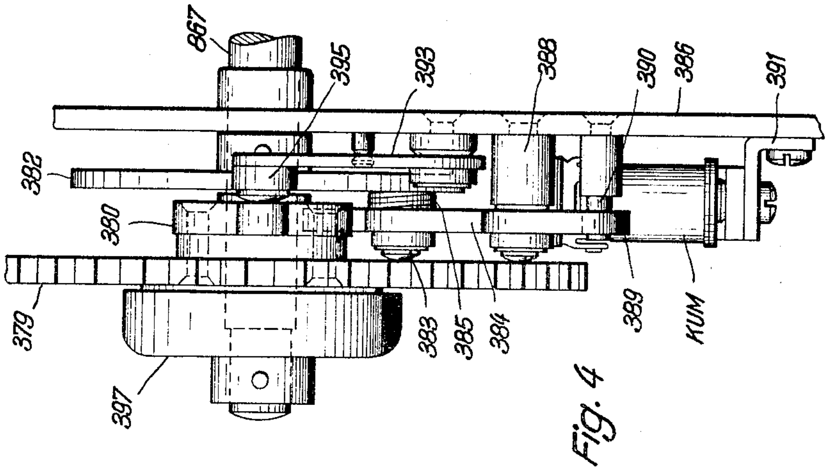
Fig. 4 is a side view of a single-turn clutch.

Since the single-turn clutches of the various sub-assemblies are all of similar design and operation, the mechanical details of only one of them will now be described in detail with reference to Figs. 4 and 5, showing the clutch of the card-carriage control assembly 860.

The main shaft (950 in Figs. 6, 10), continuously driven by motor MD, carries a spur gear (not illustrated) which is in meshing engagement with a spur gear 379 (Fig. 4) of the clutch. Hence, spur gear 379 and a cam 380 rigidly connected therewith rotate continuously about a normally arrested control shaft 867 (Figs. 4, 5, 6), which forms the main shaft of the carriage control assembly 860. Mounted on, and rigidly pinned to, the control shaft 381 is a disc 382 (Figs. 4, 5). A pivot pin 383 riveted into disc 382 carries a pawl 384 which is biased toward cam 380 by means of a helical spring 385 surrounding the pivot pin 393. Another pivot pin 388 mounted on a side wall 386 carries a latch lever 389. The pivotal movement of latch lever 389 is limited by a stop pin 390 likewise mounted on side wall 386. The side wall 386 further carries an angular bracket 391 which firmly supports a carriage-travel control magnet KUM. The armature 392 of the magnet enters into a fork-shaped recess 389*a* of latching pawl 389.

As long as the armature 392 is dropped off, as shown in Fig. 5, a shoulder 389*b* of latch pawl 389 holds the pawl 384 out of the range of the continuously rotating cam 380, while a detent 393 pivoted on wall 386 keeps the disc 382 arrested by means of a roller 395 engaging a notch 396 of disc 382 under the force of a biasing spring 394. When magnet KUM is excited, its armature 392 moves the latch 389 counter-clockwise so that pawl 384 is released. The nose 384*a* of pawl 384 then enters into the range of the next cam projection and is entrained by the rotating cam 380. Now the disc 382 and the carriage control shaft 867 partake in the rotation of cam 380 for one complete turn, provided the magnet KUM is deenergized sufficiently early so that pawl 384, after completion of one rotation, can again place itself in front of the shoulder 389*b* of latch 389.

Figure 6:
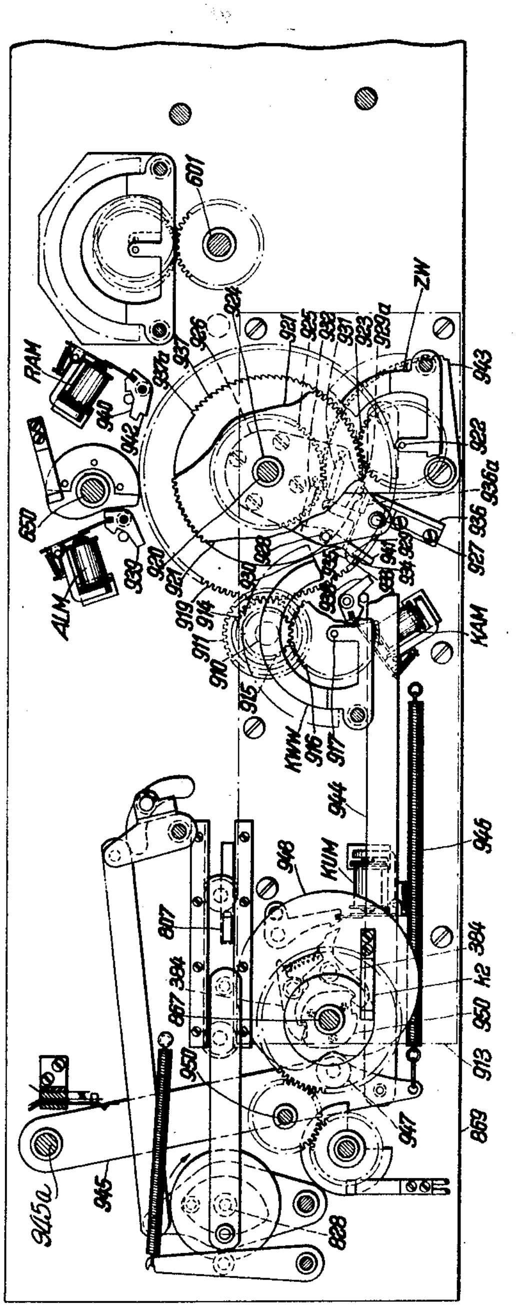
Fig. 6 is a side view of mechanisms for tensioning the carriage driving springs.

Added to the single-turn clutch just described is an over-run clutch 397 (Fig. 4) of conventional design. Clutch 397 is interposed between the continuously rotating spur gear 379 and the control shaft 867 to prevent over-running of shaft 867. The over-run clutch 397 may be replaced by a second detent 384 as is shown in Fig. 6. Mounted on the control shaft 867 (Fig. 3) are a number of control cams (867*b*, 867*c* in Fig. 11) which actuate respective groups of electric control contacts described in a later place.

*Monitor switches*

The programming assembly 1000 (Fig. 1) which controls the starting and stop pulses for monitoring the other sub-assemblies is essentially composed of selector switches FW of the stepping-switch type (Fig. 10) hereinafter also called "monitors." These monitoring switches are likewise connectible with the machine main shaft by means of a switching magnet MM which is excited by a switching pulse and then causes the stepping mechanism of the monitor to progress step by step. A number of mutually insulated bank contacts 505 are mounted along the travel path of each monitoring selector switch. The central shaft 503 of the switch carries a rotatable disc 504 on which a number of contact spoons 1550 to 1557 (Figs. 10, 12) are mounted and insulated from each other. Each individual contact spoon forms a conductive connection between two adjacent bank contacts 505. The insulating disc 504 is firmly connected with a ratchet 506 (Fig. 10) which serves to impart stepwise rotation to the disc and contact spoons. Due to the uniform distribution of the contact spoons over the periphery of the insulating disc, the selector switch reaches its original starting position after performing a given number of individual steps. The particular stepping switch shown in Fig. 10 thus returns to the starting position after performing five progressive switching steps.

The stepping switch is driven from the continuously revolving main drive shaft 507 of the machine. Shaft 507 carries an eccentric 507*a* which, by means of a linking rod 507*b*, imparts a continuous reciprocating movement to a swing beam 508 rotatably mounted on a shaft 509. Also mounted on shaft 509 is a pawl carrier 510 which is biased by a spring 511 into engagement with a stop pin 512. A latch pawl 513, pivoted on carrier 510 at 510*a*, has a lug 514 in engagement with the armature 514*a* of a magnet MM as long as the armature is in the dropped-off position shown in Fig. 10. The armature then keeps pawl 513 out of the oscillating range of swing beam 508.

When magnet MM is excited by a starting pulse, the armature 514*a* is withdrawn from lug 514, and a spring 513*a* turns the latch pawl 513 into the stroke range of swing beam 508 so that the pawl carrier 510 participates in the oscillatory motion of the swing beam. Now a driver pawl 515, pivoted at 515*a* to the pawl carrier 510, enters into the teeth of ratchet 506 and advances it one tooth division while a detent 516 pivoted to pawl carrier 510 at 510*a* simultaneously releases the ratchet 506. If the magnet MM, during the return stroke of swing beam 508 is deenergized, the lug 514 of latch pawl 513 places itself in front of the armature 514*a*, and the switching operation of the selector switch is terminated.

A switching mechanism of the type described may be provided with one or several rows of bank contacts in coaxial relation to each other. Furthermore, several such multi-row switching mechanisms may be placed side by side and their driving motion may be derived from a single swing arm, whereas the control of the individual switching mechanisms is effected by separate electromagnets.

*Carriage control assembly*

Figure 3:
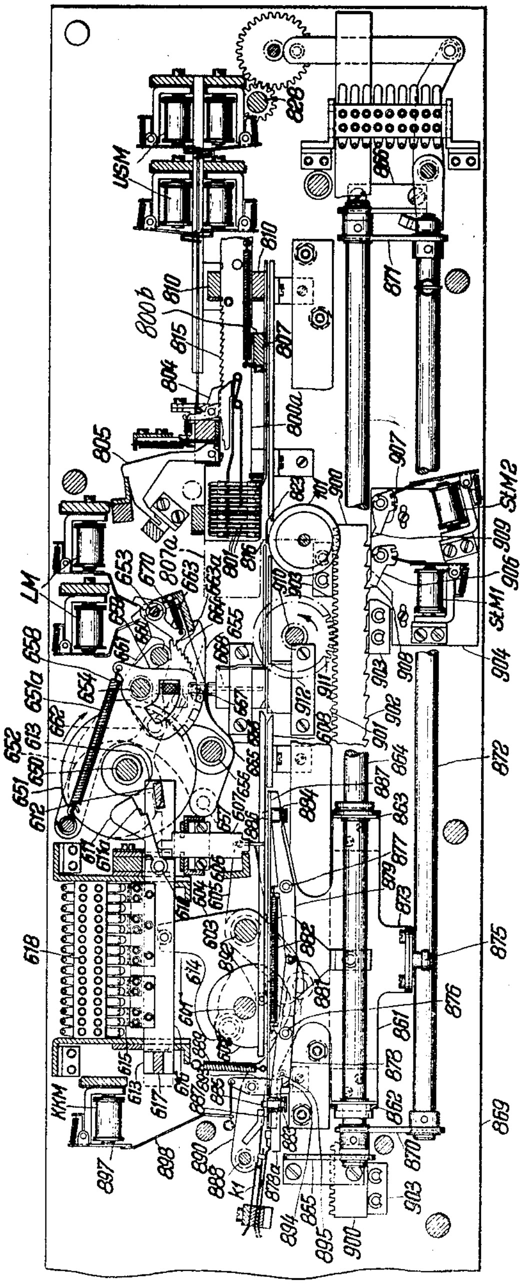
Fig. 3 is a partly sectional side view of the card-carriage assembly of the machine and includes the assemblies shown in Fig. 2, as well as a printer assembly of the machine.

In the illustrated embodiment of the invention, the card-carriage control assembly 860 is given a mechanical design. A card carriage 861 (Figs. 3, 7, 8, 13) has a flat top member 887 bent laterally away from the main body of the carriage and forming a top surface for supporting the account card 609. The carriage is provided with two extensions 862 and 863 by means of which the carriage is displaceably mounted on a tubular guide rod 864 firmly secured to a side wall 869 of the assembly frame structure by means of two angular supports 865 and 866 (Fig. 3). Another tubular guide rod 872 is fastened to the carriage-guide rod 864 by means of two connecting pieces 870, 871 and is straddled by two guide rollers 874, 875 journalled on another extension 873 of the card carriage 861. In this manner, the card carriage 861 is securely guided for linear displacement along the two rods.

Figure 14:
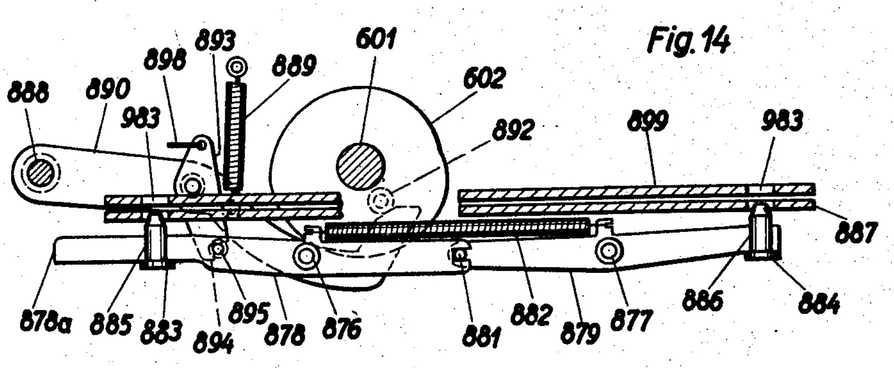
Fig. 14 shows a detail of the carriage assembly according to Fig. 3 on larger scale.

After the account card is inserted into the card carriage, it is clamped fast upon the top surface member 887 of the carriage. For this purpose, the carriage 861 has two pivot pins 876 and 877 on which respective clamping levers 878 and 879 (Figs. 3, 8, 14) are rotatably mounted. The two clamping levers are linked with each other by a pin-and-slot connection 881. A spring 882 tensioned between respective lugs of clamping levers 878 and 879 tends to turn clamping lever 878 clockwise (Fig. 3) about pivot 876 and to turn clamping lever 879 counter-clockwise about pivot 877. Under the force of spring 882, a plunger pin 885, fastened to a lateral lug 883 of clamping lever 887, normally protrudes upwardly through a hole in the flat top member 887 of the card carriage 861 and occupies the position illustrated in Fig. 3. Similarly, a plunger pin 886, fastened to a lateral lug 884 of clamping lever 879, is normally held in the illustrated position so as to protrude upwardly out of the card-supporting surface of top member 887. The plunger pins 886 and 885 of the card-clamping device can enter through two respective mating holes 983 of the account card 609 (Fig. 7) for aligning the card in a manner still to be described.

Figure 7:
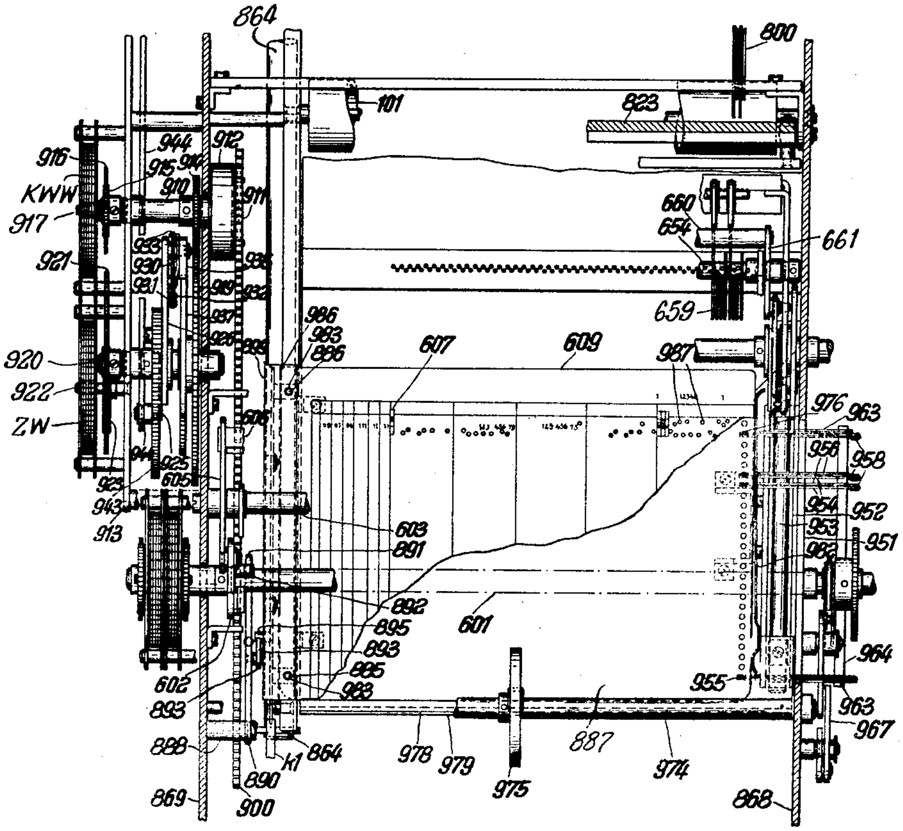
Fig. 7 is a partly sectional top view of the card-carriage assembly of the machine.

A pivot pin 888 (Fig. 3, left; Fig. 7, lower left) is riveted into the side wall 869 and carries a rotatable switching lever 890 biased counter-clockwise (Fig. 3) by a spring 889. The switching lever 890 has a projection 891 (Fig. 7) coacting with a roller 892 journalled on a cam disc 602 which is pinned onto a control shaft 601 (Figs. 7, 3, 14) whose functioning will be explained in a later place. Pivoted to switching lever 890 is a coupling lever 893 which has a recess 894 for cooperation with a coupling pin 895 (Figs. 3, 7, 8) riveted into the clamping lever 878. In the normal, inactive condition of the machine, the coupling lever 893 is turned counter-clockwise (Fig. 3) so that its recess 894 abuts against the pin 895 and thus maintains the clamping lever 878, and through the pin-and-slot connection 881 also the clamping lever 879, in inactive position in opposition to the force of spring 882. In this inactive position, the plunger pins 887 and 886 of respective clamping levers 878 and 879 are lowered (Fig. 3) and also remain in inactive position so as to open a receiving slot 976 formed between the top-surface member 887 of card carriage 861 on the one hand and a cover sheet 899 (Fig. 8) on the other hand. Consequently, in this condition of the machine, an account card can be inserted into the receiving slot 976.

When at the proper time a clamping magnet KKM (Figs. 3, 10) is energized, it attracts its armature 897 (Fig. 3) which causes a connecting rod 898 to turn the coupling lever 893 clockwise to the position shown in Fig. 3. Now the spring 882 can turn the two clamping levers 878, 879 and thus places the respective plunger pins 885, 886 into the active position illustrated in Fig. 3. During such motion, an extension 878*a* of clamping lever 878 closes a contact *k*1 (Figs. 3, 11) for a control purpose explained further below.

For reliably controlling the feeding travel of the card carriage 861, a rack member 900 (Figs. 3, 7, 8) is firmly attached to the carriage 861 by screws and is slidably guided in bearing blocks 903 attached to the side wall 869 (Fig. 3). The rack member 900 has rack teeth 901 along one longitudinal edge and stop teeth 902 along the opposite edge. The stop teeth 902 of rack member 900 have a spacing from tooth center to tooth center which corresponds to the spacing between two entry lines of the account card located on the card carriage. A supporting plate 904 (Fig. 3), adjustably mounted on side wall 869, carries two pivotally rotatable stop pawls 906, 907 controllable by respective electromagnets *St*M1, *St*M2. When one of the two magnets *St*M1, *St*M2 is energized, it turns the stop pawl 906 or 907 clockwise until the pawl nose 908 or 909 enters into engagement with a tooth of the stop teeth 902 in rack member 900. The stop pawls 906 and 907 are spaced from each other in the longitudinal direction of the rack member a distance corresponding to an odd number of the line spacings on the account card 609 (see Fig. 7) so that, in the starting position of the card carriage 861 shown in Fig. 1, the stop pawl 906 controlled by magnet *St*M1 is assigned to all even-numbered lines, 0, 2, 4, 6, 8 etc. of an account card located in the card carriage 861, whereas the stop pawl 907 controlled by magnet *St*M2 is assigned to all odd lines 1, 3, 5, 7, 9 etc. of the card. In the position illustrated in Fig. 3, an account card located in the card carriage 861 would be in the position "line 0." The device just described affords the use of satisfactory pulse intervals in conjunction with relatively rapid travel motion of the card carriage.

The rack teeth 901 of rack member 900 mesh with a spur gear 911 (Figs. 3, 6, 7, 8) fastened on a shaft 910. Spur gear 911 is rigidly attached by screws to a spring mechanism 912 (Fig. 2) for driving the card carriage. The shaft 910 is revolvably journalled in and between the side wall 869 and an intermediate wall 913 (Fig. 7) of the assembly frame structure and is pinned together with two further spur gears 914, 915 (Figs. 6, 7). Spur gear 915 meshes with a spur gear 916 fastened on a shaft 917 of a carriage-travel selector switch KWW which operates as a current distributor. The shaft 917 and hence the movable contact means (987, 987*a* in Fig. 11) thus rotate in proportion to the carriage travel in order to close a circuit through a multiplicity of stationary bank contacts assigned to respectively different travel positions of the carriage.

The spur gear 914 (Figs. 6, 7), joined with the carriage-driving spur gear 911, meshes with a spur gear 919 on a shaft 920. Shaft 920 is also journalled between the wall 869 and intermediate wall 913 (Figs. 6, 7) and is pinned together with another spur gear 921 which meshes with a spur gear 923. Spur gear 923 is pinned to the shaft 922 of a line selector switch ZW which also operates as a current distributor whose movable contact means (988, 988*a* in Fig. 11) also operate in proportion to the carriage travel.

Figure 11:
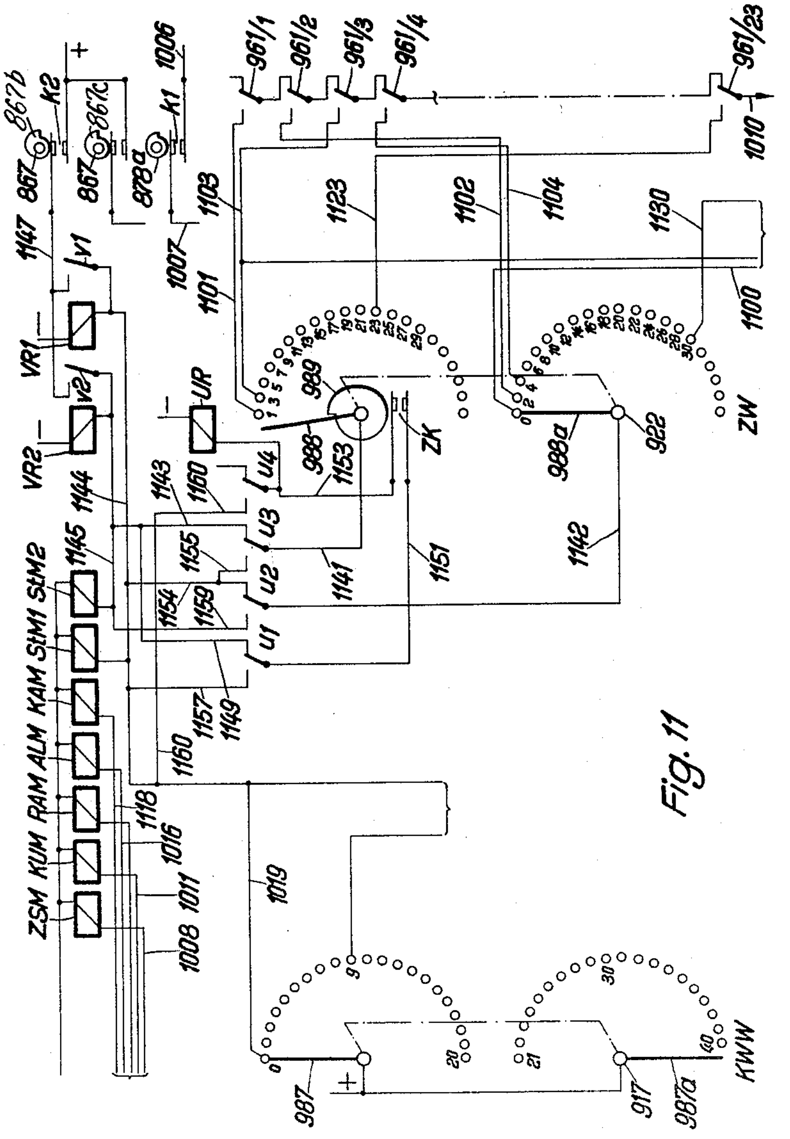
Fig. 11 is a schematic circuit diagram of the card-carriage control.
Figures 15, 16:
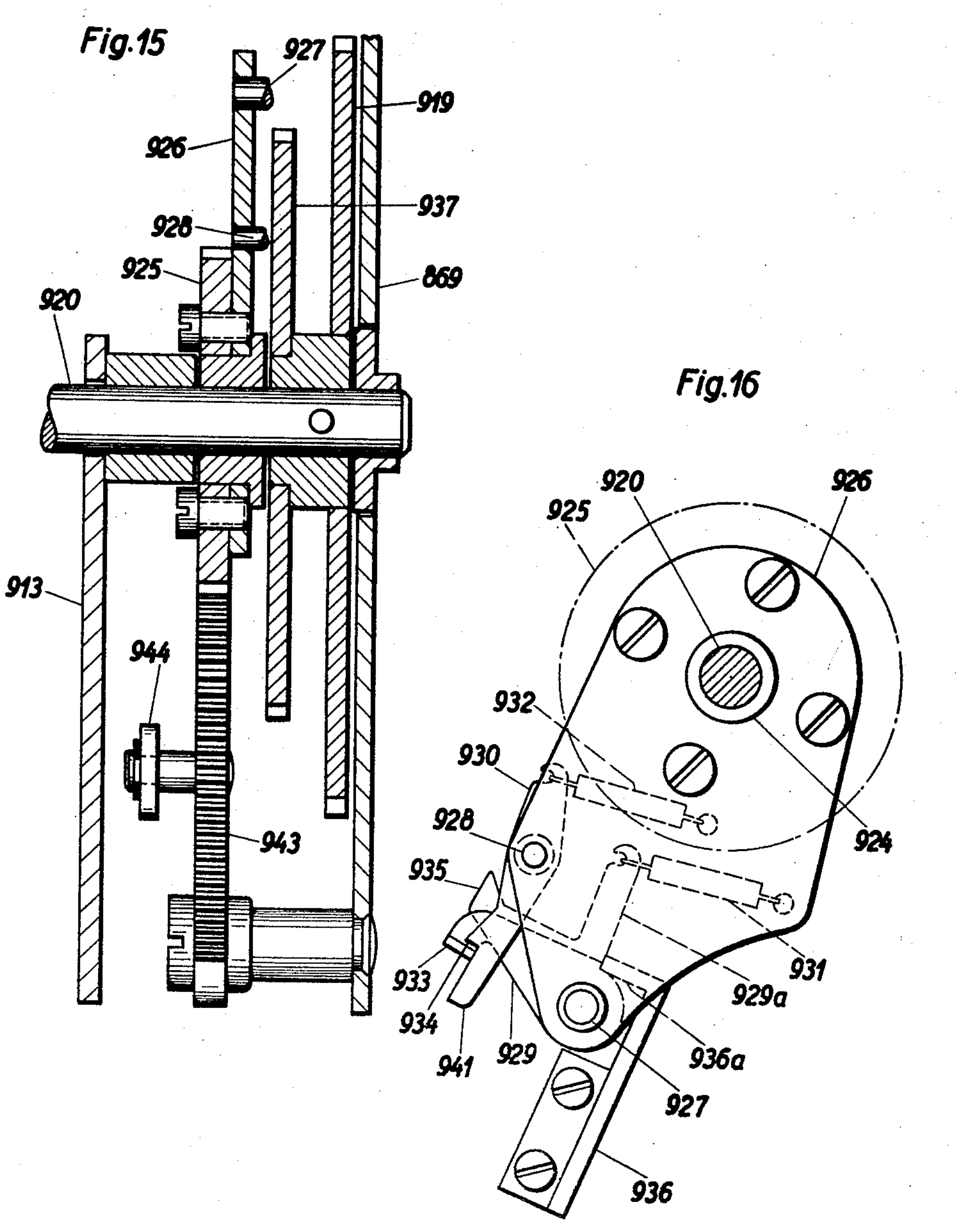
Fig. 15 shows a detail of Fig. 7 on larger scale.
Fig. 16 shows a detail of Fig. 6 on larger scale.

The above-mentioned spur gear 911, meshing with the rack teeth of member 900 on card carriage 861, is biased counter-clockwise (Figs. 3, 6) by the spring mechanism 912, thus tending to displace the carriage to the right. The machine components described presently serve for displacing the carriage to the left (Fig. 3) and for automatically winding up the carriage-driving spring mechanism 912 after it has run down. For this purpose, a spur gear 925 and a swing arm 926 (Figs. 6, 7, 15, 16) are firmly joined together and rotatably mounted on the above-mentioned shaft 920 by means of a bushing 924. The swing arm 926 carries two pivot pins 927 and 928. A multi-legged switching pawl 929 is pivoted on pin 927. A switching pawl 930 is pivoted on pin 928. Both pawls 929, 930 are biased clockwise (Figs. 6, 16) by respective springs 931, 932. The switching pawl 929 has a lateral lug 933 which rests against a recess 934 of the pawl 930 and thus keeps switching pawl 929 in the position illustrated in Figs. 6 and 16. The nose 935 of pawl 929 can cooperate with a ratchet gear 937 whose row of teeth extends over part of the periphery only. Gear 937 is pinned onto the shaft 920. Such cooperation takes place after pawl 930 is moved away from lug 933 of switching pawl 929 in opposition to the pull of spring 932. For producing such releasing motion, a number of pawls 938, 939, 940 are pivoted along the circular arc traversed by the swing arm 926 when rotating about the shaft 920. The pawls 938, 939, 940 are turned about their respective pivots under control by respective switching magnets KAM, LAM, RAM (Figs. 6, 11). When thus turned, the pawls can cooperate with a projection 941 of pawl 930 in a manner still to be described.

The switching pawl 940 is provided with a recess 942 which is engageable by a projection 941 of pawl 930 only when the pawl 940 is in its illustrated position of rest. A stop 936 firmly secured to side wall 869 serves to latch the switching pawl 929 in its active position when the swing arm 926 is in the illustrated position of rest, this latching operation being more fully described in a later place.

The spur gear 925, firmly joined with swing arm 926, meshes with a spur-gear segment 943 (Figs. 6, 7) rotatably mounted on the side wall 869. A pull rod 944 connects the segment 943 with a swing lever 945 likewise rotatably mounted on the side wall 869. A spring 946 (Fig. 6) hung into the swing lever 945 biases this lever counter-clockwise about its pivot 945*a* and holds a roller 947, journalled on lever 945, into engagement with a cam disc 948 pinned onto the carriage control shaft 867. By means of a single-turn clutch of the type described above with reference to Figs. 4 and 5, the carriage control shaft 867 is driven a single complete revolution from the continuously rotating machine main shaft 950 (Figs. 6. 10) as soon as the carriage travel control magnet KUM is excited. The resulting switching movements of the above-described machine components have the effect of displacing the carriage to the left while tensioning the spring mechanism as will be described in detail further below.

*Line finder*

A line finder device is provided for locating the last entered line of the account card 609 (Fig. 7) on card carriage 861. The line finder device comprises the following components.

Firmly attached to a side wall 868 of the carriage control assembly (Figs. 7, 8, 9) is a U-shaped support 952 which carries a feeler shaft 953 upon which a multiplicity of line feeler members are rotatably arranged in a row. The feeler members protrude partially through an opening 951 in side wall 868. Each feeler member comprises a feeler lever 954 (Fig. 8) which has one end linked to a feeler pin 955. An angular coupling lever 956 is pivotally mounted on the other end of lever 954. Each line feeler member further comprises a switching lever 957 which is likewise rotatably mounted on the feeler shaft 951. The coupling lever 956 is biased counter-clockwise (Fig. 8) by a spring 958 hung into a leg 954*a* of lever 954. The nose 959 of coupling lever 956 cooperates wtih a catch 960 of switching lever 957. Each switching lever 957 carries an electrically insulated contact piece 961 which electrically interconnects a center contact of a stationary contact assembly 962 with either one of the two outer contacts of the same assembly at a time. The contact assembly 962 is firmly mounted on the side wall 951 of the machine frame structure.

The line feeler members are located within a control frame composed of two lateral parts 963 (Figs. 7, 8, 9) rotatably mounted on the feeler shaft 953, and a transverse bar 964. The bar passes between the legs 954*a* of respective feeler levers 954 on the one hand, and the coupling levers 956 and the circularly curved arms 965 of respective switching levers 957 (Fig. 8) on the other hand.

Mounted on respective opposite sides of the transverse bar 964 are two respective links 966 (Fig. 9) which are pivotally linked with respective angular levers 968 and 969. The levers 968, 969 are pivoted on side wall 868 at 968*a* and 969*a* respectively, and are coupled with each other by a linking rod 967. An arm 970 of angular lever 969 is linked to a connecting rod 972 of an eccentric 972*a* mounted on the line-finder control shaft 971. The line-finder control shaft 971 is connected with the machine main shaft by a single-turn clutch of the type described above with reference to Figs. 4 and 5. When this clutch is released by a control magnet ZSM (Fig. 11), the line-finder control shaft 971 (Fig. 9) is driven a single revolution. During this operation, the eccentric 972*a*, during its first 180° of rotation, imparts clockwise motion to angular lever 969 about pivot 969*a* and, through linking rod 967, also imparts clockwise motion to angular lever 968 about pivot 968*a*. During the remaining 180° of rotation, the angular levers 968 and 969 are turned back to the starting position.

The just-described forward and return strokes of the line-finder driving mechanism are transmitted by links 966 (Fig. 9) to the transverse bar 964 of the feeler control frame. During the forward stroke, the transverse bar 964 (Fig. 8) moves downward. Each coupling lever 956 (Fig. 8) whose nose 959 abuts against the catch 960 of switching lever 957, imparts clockwise motion through spring 958 to the feeler levers 954, and through arms 965 also to the switching levers 957. As a result, the contact pieces 961 riveted to the switching levers 957 are turned clockwise from the active position shown in Fig. 8 to the zero position. Simultaneously, the levers 954 raise the feeler pins 955 toward the account card 609 (Fig. 7) located in the card carriage. Those feeler members whose feeler pins 955 (Figs. 8, 7) can pass through a line hole 976 (Fig. 7) of the account card 609, follow the further upward movement of the transverse bar 964 without any change in the positions of the feeler components relative to each other from the positions shown in Fig. 8. Consequently, during the following upward return travel of the transverse bar 964, the switching levers 957 and contact pieces 961 are moved by the angular levers 956 back into the active position shown in Fig. 8. All levers 958 whose respective feeler pins 955 do not find a line hole and hence abut against the body of the account card, cannot follow the downward movement of the transverse bar 964. Consequently, the resiliently journalled angular levers 956, turned clockwise (Fig. 8) by the transverse bar 964, glide at their noses 959 over the catch noses 960 of the respective switching levers 957. The feeler levers 954 are no longer coupled with the respective switching levers 957 so that during the upward return movement of the transverse bar 964 the switching levers 957 are not entrained whereby the contact pieces 951, by virtue of the clamping friction in the contact assembly 962, remain in the zero position previously occupied.

The line finder device just described is essentially an electric switching assembly which possesses a separate reversing switch for each possible line of the account card, this reversing switch being active, when the feeler enters through a line hole in the account card, to move from its inactive position into the active position, whereas all reversing switches that do not encounter a hole on the card remain in the inactive zero position. The switching operation thus performed will be more fully described below with reference to Fig. 11.

*Card feeder*

As mentioned, the account card 609 (Fig. 7) before being conveyed by the card carriage 861 into the scanning, punching and printing positions, must first be passed from the lay-on table (T1 in Fig. 1) onto the carriage 861. This is done by means of a card feeder device of the type shown and described in the above-mentioned copending application Serial No. 624,395, filed November 26, 1956, now Patent No. 2,825,561. The card feeder comprises a rubber-covered feed roller 975 (Fig. 7) mounted on and pinned to a shaft 974. The feed roller 975, when in operation, rests against the top surface of the account card and when rotating entrains the card by frictional engagement and shifts it into the receiving slot of the carriage. The feed-roller shaft 974 is driven from the machine main shaft by means of a single-turn clutch 984 (Fig. 9) similar to the one described above with reference to Figs. 4 and 5. A control magnet EZM (Figs. 9, 12), when momentarily energized, turns a stop pawl 905 (Fig. 9) away from the pawl 918 of the clutch which then permits the drive shaft 973 to revolve 180° until pawl 918 abuts against the stop pawl 905 now in stop position. When thereafter, at the proper time, another magnet ABM is temporarily excited, it turns another stop pawl 949 into inactive position, so that the drive shaft 973 can turn further until again stopped by pawl 973, thus completing the remaining 180° of revolution. The first 180° of revolution of shaft 973 released by magnet EZM cause the shaft 974 to feed roller 975 to turn counterclockwise, whereas the second 180° of revolution released by magnet ABM cause the feed roller 975 to turn clockwise, as is more fully shown and described in the above-mentioned Patent No. 2,825,561.

Two guide plates 978, 979 (Fig. 8) are provided for reliably guiding the account card in the receiving slot 976 (Fig. 8) of the card carriage 861. The two plates 978, 979 are fastened by means of supporting angles 980 to the side walls 868, 869 of the carriage-assembly frame structure. Secured to guide plate 979 is a supporting bracket 981 which carries a leaf spring 982 for urging the account card 609 into the receiving slot 976 of the card carriage 861. A stop 986 (Fig. 7) located in the receiving slot 976 limits the feed motion of the account card 609 produced by means of the feed roller 975 as described above.

*Scanner assembly*

Figure 8:
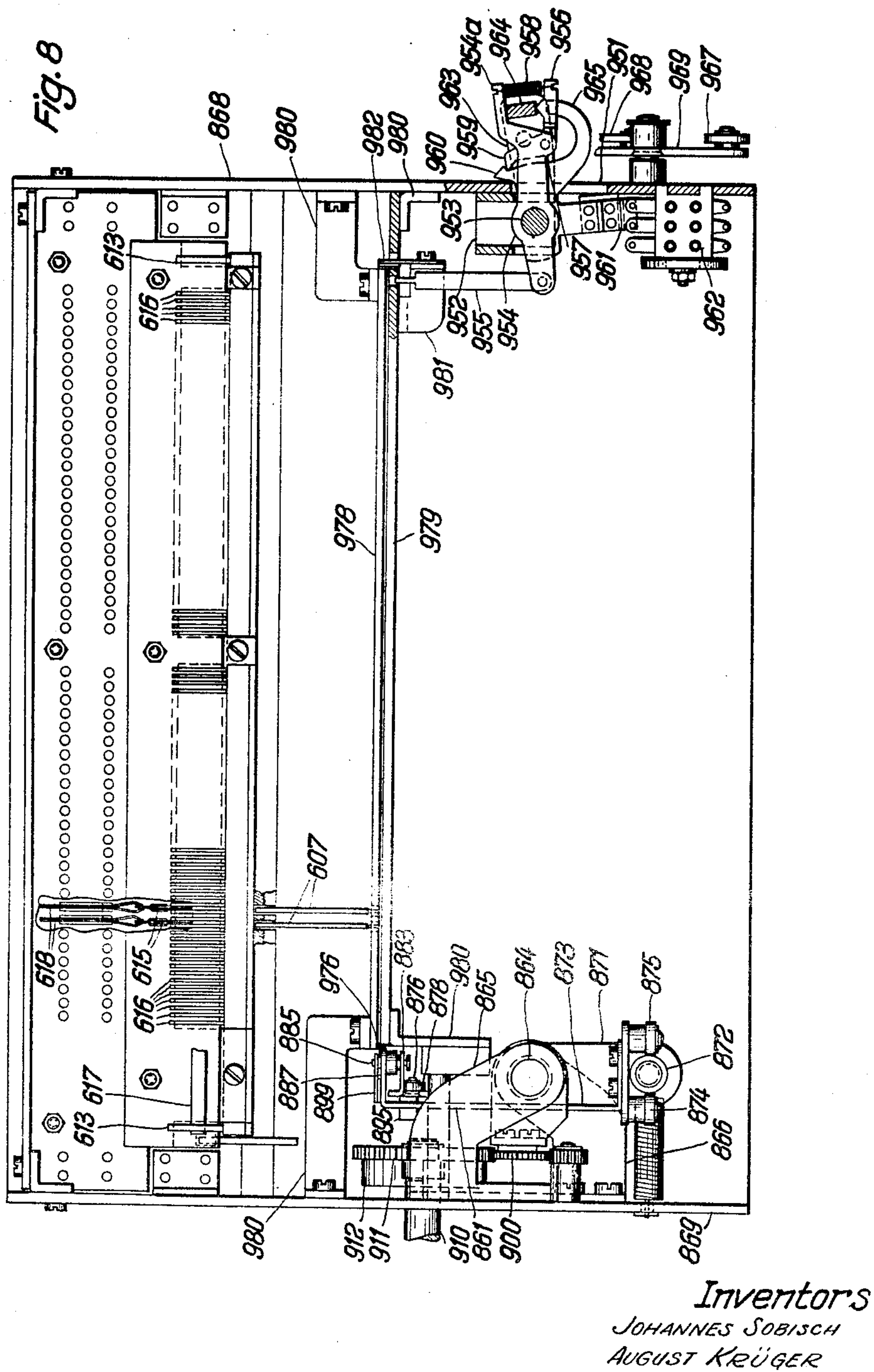
Fig. 8 is a front view of the card carriage and of the line finder device.
Figure 9:
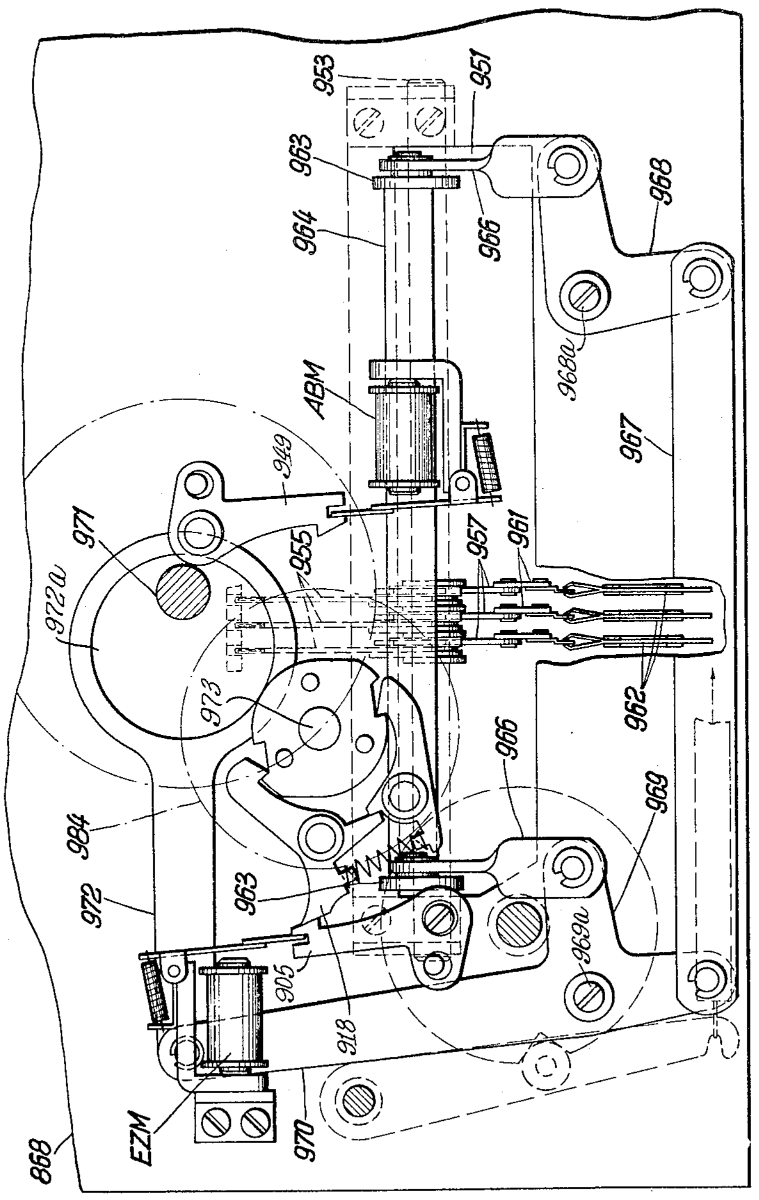
Fig. 9 is a side view of the line finder device.

In the starting position of the card carriage 861 illustrated in Fig. 3, the account card 609 in the carriage has its head punchings 987 (Fig. 7) located beneath the feeler pins 607 (Figs. 2, 3, 8) of the scanning assembly 600. When the control shaft 601 (Fig. 2) of the scanning assembly 600 is connected with the machine main drive by means of the appertaining single-turn clutch of the above-described type, then the control shaft 601 performs a single revolution in the clockwise direction and turns two cams 602 which actuate respective drive levers 604, 605 rotatably mounted on a shaft 603. An angular rail 606 fastened to the drive lever 605 normally holds the feeler members 607 (Figs. 2, 8) in inactive position; but when the drive lever 605 is actuated by rotation of the scanner control shaft 601 as just described, the rail 606 is lowered so that the feeler members 607 are also lowered onto the account card 609 where they can enter into any present punched holes of the card. Each feeler member 607 cooperates with one of a number of coupling pieces 611 (Fig. 2) each linked by a pivot pin 610 to one of an array of longitudinally displaceable control sliders 616 (Figs. 2, 8) respectively. Due to their own weight, the coupling pieces 611 follow the downward motion of the lowered feeler members 607 whereby a shoulder recess 611*a* of each lowered coupling piece 611 enters into engagement with a transverse bar 612 of a driving frame 613 (Figs. 2, 8).

The above-mentioned drive levers 604 (Figs. 2, 3) when being actuated by revolution of the scanner control shaft 601, impart to the driving frame 613 a motion in the direction of the arrow 614. As a result, the transverse bar 612 displaces those control sliders 616 that are correlated to the lowered feeler members, whereas the remaining sliders 616, whose corresponding coupling pieces 611 remain in raised, inactive position because the appertaning feeler members do not encounter a hole in the account card, are not latched to the transverse bar 612 and thus remain in the starting position shown in Figs. 2 and 3. Each control slider 616 carries an insulated electric contact member 615 so that the slider displacement produces a change in an electric circuit connection as will be further described in a later place.

Figure 2:
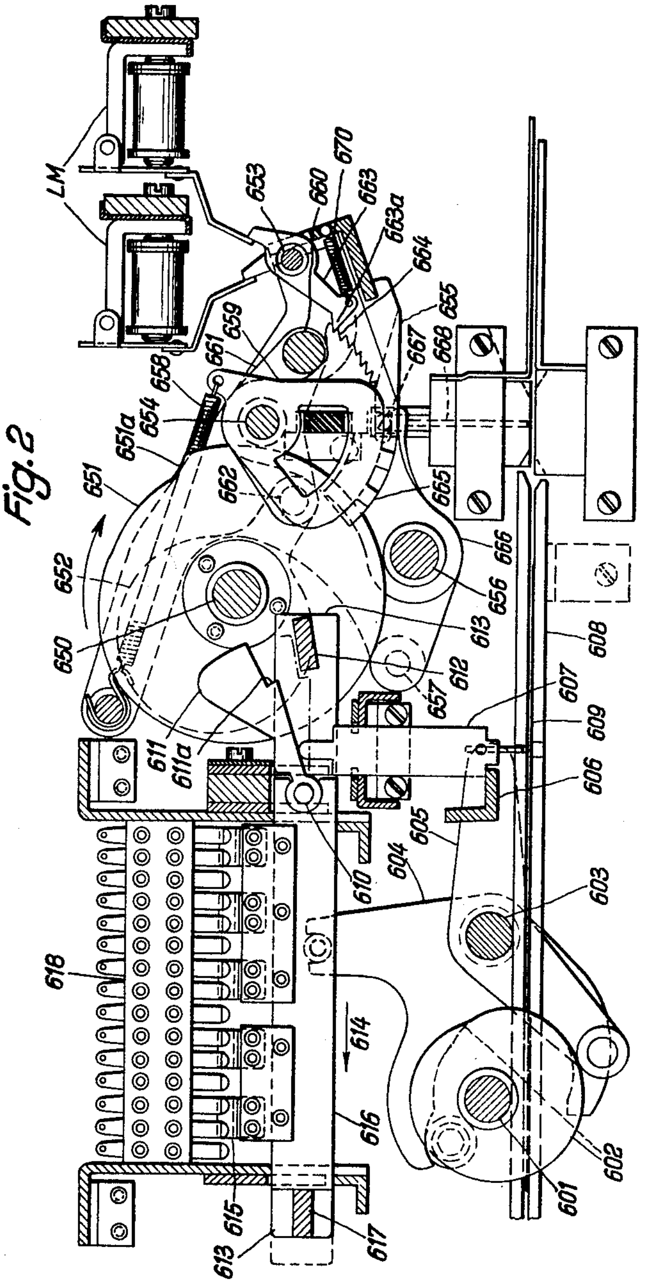
Fig. 2 is a partial and partly sectional view of the machine, particularly showing the scanner and puncher assemblies.

During the further revolution of the scanner control shaft 601, the angular rail 606 mounted between the drive levers 605 is again lifted so that the previously lowered feeler members 607 and the coupling pieces 611 cooperating therewith are returned into the inactive starting position illustrated in Fig. 2. At the same time the drive lever 604 returns the driving frame 613 and, by means of a transverse bar 617, also the previously displaced control sliders 616, back into starting position.

Figure 12:
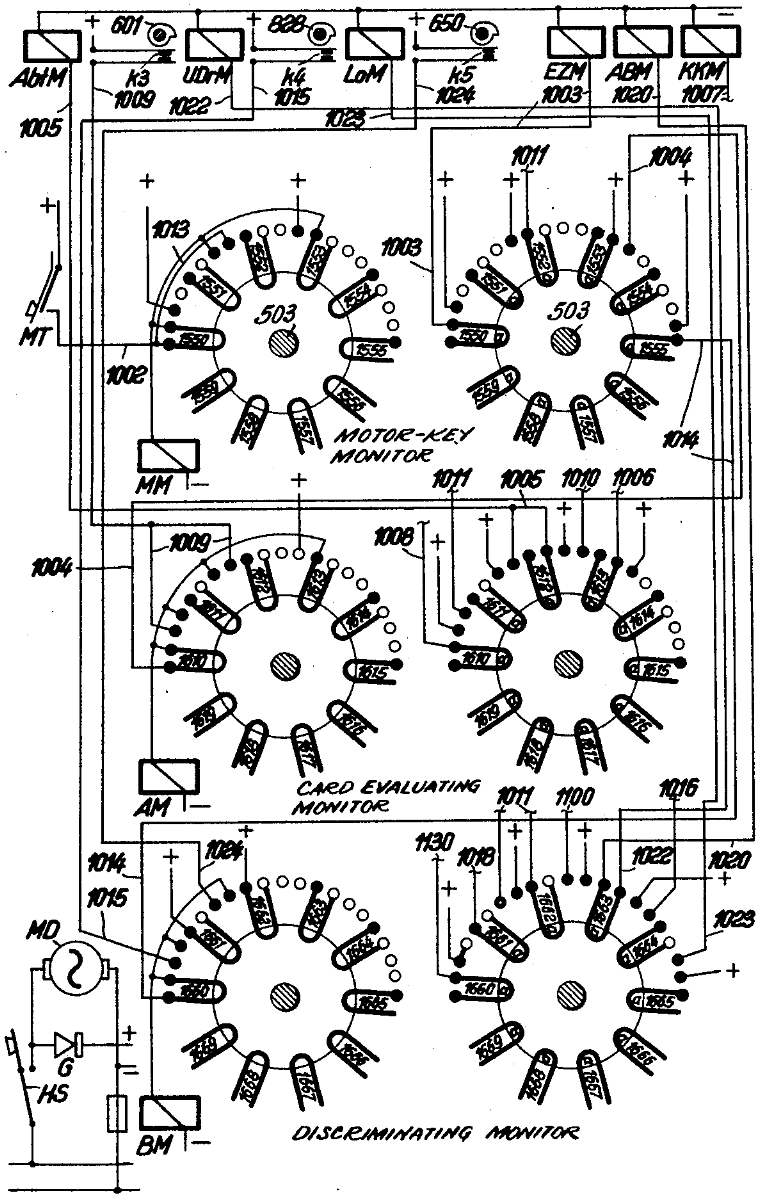
Fig. 12 shows schematically the circuit diagram of the entire machine in simplified form, limited to the fundamentals of the electric system.
Figure 13:
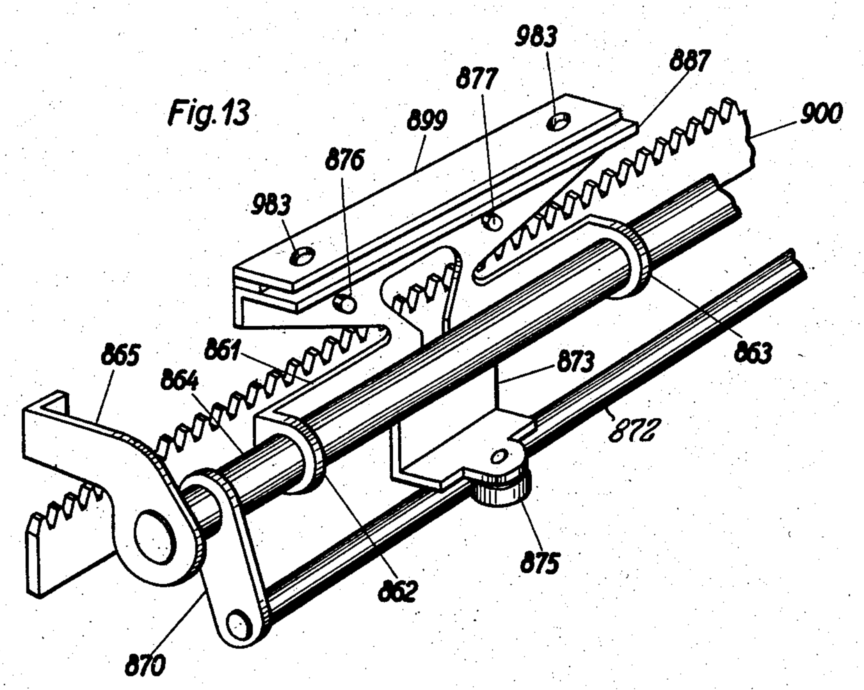
Fig. 13 is a schematic and perspective view of the card carriage.

The above-described scanner assembly translates the values or symbols represented in the account card 609 by code hole combinations into electric circuit connections which are transferred to the other component subassemblies of the machine before the scanning assembly is re-set to zero. The single-turn clutch for connecting the scanner control shaft 601 to the machine main drive is released for a single-turn operation by means of a scanner control magnet A*bt*M (Fig. 12).

After the account card 609 on card carriage 861 has been scanned in the above-described manner, the carriage, in the further course of accounting performance, conveys the card into printing position. Before describing the electric components and circuit connections that become effective to shift the card away from the scanning position, it will be necessary to first briefly describe the construction and operation of the lower-printer assembly 800 (Fig. 1). This will be done with reference to Fig. 3.

*Printer assembly*

Each individual type carrier 800*a*, assuming that it is designed for the printing of numbers, carries a set of individually displaceable type bars 801 provided at their respective lower ends with printing types corresponding to the numbers 0, 1, . . . 9. Type carriers of this design are known as such from U.S. Patent 2,698,573 of A. Krüger, and are also shown and described in the copending applicatin of J. Sobisch et al., Serial No. 624,241, filed November 26, 1956; both assigned to the assignee of the present invention.

Each individual type carrier 800*a* is provided with a magnet USM which, when excited, moves a pawl 804 into a row of ratchet teeth 815 of the type carrier 800*a*. All type carriers of the printer assembly are simultaneously displaced by means of a beam 807 driven from the printer control shaft 828 so that the respective selected type bars 801 are placed onto the printing position indicated by a vertical dot-and-dash line 216. The types to be imprinted upon the card are then located in front of the platen roller 101 (Figs. 3, 7). When the magnet USM (Fig. 3) of a type carrier 800*a* is excited, the pawl 804 enters into the ratchet 815 of the carrier so that the carrier is stopped and an appertaining spring 800*b* is tensioned while the driving beam 807 continues its travel toward the left into a limit position indicated by a dot-and-dash line 807*a*. After the beam 807 has reached this limit position all type carriers 800*a* are properly adjusted to the printing position. Then a striker 805 is released and produces on the account card resting against the platen roller 101 an imprint by means of an inking ribbon 823. All type carriers 800*a* that have not been arrested by excitation of their respective magnets USM and hence reach the limit position do not have a type bar located on the printing line 816. Consequently, only the properly selected types are imprinted upon the account card.

A printer current distributor (not illustrated) rotating in synchronism with the displacing motion of the type carriers, controls the stop magnets USM to respond at the proper moment.

The printer control shaft 828 is likewise driven by means of one of the single-turn clutches already described. The control magnet for this clutch is denoted by UD*r*M in Fig. 12. Shortly before the printer control shaft 828 (Figs. 3, 12) completes its single revolution it closes a contact *k*4 (Fig. 12). The electric pulse thus produced serves control purposes still to be explained.

*Puncher assembly*

After completed impression of the values or data to be entered into the account card, the card carriage 861 transfers the card to the punching position. According to Fig. 3, the main control shaft 650 of the puncher is coupled at the proper time with the machine main drive by a single-turn clutch of the above-described design and then performs a single revolution, the control of the clutch being effected by a control magnet LoM (Fig. 12).

Rigidly mounted on the main control shaft 650 (Figs. 3, 6) of the puncher assembly are two cam discs 651 (Fig. 3) and two eccentric drive members 652. A puncher frame 655, formed of two side parts and two shafts 653, 654, has a pivot shaft 656 journalled in the side walls 868, 869 (Figs. 3, 6, 7, 8, 9) of the carriage-assembly frame structure and is normally held in inactive position by means of two rollers 657 (Fig. 3) mounted on the respective side parts of the puncher frame and resting against the respective cam discs 651. A number of puncher segments 659 (Figs. 3, 7) are rotatably mounted side by side upon the shaft 654 and are individually biased counter-clockwise by respective springs 658 (Fig. 3). A switching frame 661 is formed by two angle pieces rotatably mounted on shaft 654 and a cross bar 660 (Figs. 3, 7). Frame 661 normally maintains the puncher segments 659 in the inactive position of rest illustrated in Fig. 3, due to the fact that the switching frame 661 is kept in its blocking position by means of the eccentric drive members 652 linked with frame 661 by means of pivot pins 662.

Rotatably mounted on shaft 653 are a number of stop pawls 663 which are correlated to the respective puncher segments 659. The stop pawls 663 can enter their respective noses 663*a* into the stop rack 664 of the respective puncher segments 659 when these racks are turned clockwise about their pivot shaft 653 by means of the stop magnets LM which are excited in a given time sequence. Each rack 664 has ten teeth. The puncher segments 659 carry respective selector pieces 665 which are shaped in accordance with the selected code combination. The selector pieces 665 cooperate, by means of an appertaining frame 666 pinned upon shaft 656, with punch pins 668 guided by a shaft 667.

When the control shaft 650 is being driven in the clockwise direction, the eccentric drive members 652 turn the switching frame 661 counter-clockwise (Fig. 3) about pivot shaft 654 so that the puncher segments 659 can likewise be turned counter-clockwise by means of their respective springs 658. This motion continues until the puncher segments 659 are arrested by the appertaining pawls 663 under control by the stop magnets LM. The puncher segments 659 not so arrested continue to move into an inactive limit position. Near the end of this adjusting motion, the link pins 662 of the eccentric drive 652 have reached a stop (not illustrated) in the puncher frame 655 and, during further progress of their motion, turn the frame 655 clockwise about the pivot axis while the rollers 667 pass along the stepped contour portion of cam disc 651. This causes the arrested puncher segments 659 and the appertaining respective selector pieces 665 to move the selected punch pins 668 downwardly with respect to the illustration in Fig. 3, so that the account card 609 then located in the range of the punch pins is provided with punched holes corresponding to the desired value-denoting code combination. During further progress of the revolution of main control shaft 650, the eccentric drives 652 and cam discs 651 are effective to return the puncher frame 655 and thus also the frame 666 carrying the punch pins 668, into the normal position, so that the punch pins 668 again assume the starting position shown in Fig. 3. The pins 662 are also active to return the switching frame 661 to the starting position so that the puncher segments 655, in opposition to the force of their respective springs 658, are also re-set to starting position. The stop pawls 663 then follow the pulling force of the appertaining springs 670 and, by virtue of the particular shape of the rack teeth 664, also return to starting position.

Shortly before the puncher control shaft 650 terminates its revolution, it closes a contact *k*5 (Fig. 12). The stop pulse thus produced operates as a control signal in the carriage-travel control system.

*Operation*

The cooperation of the carriage control assembly with the line finder responding to the last-entered line of the account card is apparent from the schematic circuit diagram of Fig. 11 which is connected with the wiring portion illustrated in Fig. 12 to form a single electric system together therewith.

The operation of the machine will be explained on the basis of an accounting example with emphasis upon the operation of the carriage control assembly while only incidentally mentioning the functioning of those other sub-assemblies of the machine that, although participating in a complete accounting operation, are known or described elsewhere and serve purposes not essential to the invention proper.

In the following, therefore, such sub-assemblies as the keyboard device 1, 1*a* for posting of values and monitoring symbols, the indicating device $l_1$ to $l_4$, the journal and card printing assemblies 200 and 800, the scanning and punching assemblies 600, the computing and storing assembly 300, as well as the programming assembly 100 will be referred to only to the extent necessary for understanding and fully describing the card-carriage control means according to the invention. For that reason, the circuit diagram of the machine illustrated in Fig. 12 is simplified in showing substantially only the components and control leads that participate in the control of the carriage travel. However, if desired, supplementary information concerning the wiring of the other component sub-assemblies may be had from the above-mentioned copending application Serial No. 624,241 (Figs. 22, 22*a*).

The sequential operation of the card-carriage control means and its coaction with the other sub-assemblies is programmed by means of the monitoring devices FW under control by a motor key MT (Fig. 12). One of these monitors has been described above with reference to Fig. 10. It should be understood, however, that each monitor comprises two or more contact paths or portions mounted side by side. The monitors form individual groups each controlled by a separate stepping magnet. In Fig. 12 the individual monitor groups are designated by legends indicative of their particular controlling function. They comprise a motor-key monitor whose stepping magnet is denoted by MM, a card-evaluating monitor with a stepping magnet AM, and a discriminating monitor with a stepping magnet BM. These individual monitors, each comprising a group of selector portions simultaneously driven by the same stepping magnet, operate to selectively connect the supply leads and exit leads, shown in Fig. 11, of the various control magnets in a predetermined manner so that the individual components function in a prescribed sequence to obtain the desired series of operations.

In the starting position of the machine the contact spoons 1550 to 1559, 1550*a* to 1559*a*, 1610 to 1619, 1610*a* to 1619*a*, 1660 to 1669, and 1660*a* to 1669*a* occupy the positions illustrated in Fig. 12. In this position, two adjacent bank contacts are conductively connected with each other. After closing the main switch HS, the machine main shafts are continuously driven by the motor MD, and the direct-current source G supplies the current required for the control operations.

When the machine is thus placed in operating condition, an account card 609 is placed upon the lay-on table T1 and the transaction is posted into the keyboard (1, 1*a* in Fig. 1). Thereafter the motor key MK (Fig. 12) is actuated. This passes a starting pulse through lead 1002 and contact spoon 1550 to stepping magnet MM, thus causing it to switch the motor-key monitor into second position. In this position, the card pull-in magnet EZM (Figs. 9, 12) is energized through lead 1003 which releases the single-turn clutch 934 so that, as described, the shaft 874 of feed roller 975 (Fig. 7) turns counter-clockwise. The laid-on account card 609 is seized by feed roller 975 and is conveyed between guide plates 978, 979 (Fig. 8) into the machine. The spring 982 takes care that the incoming card 609 properly enters into the receiving slot 976 (Fig. 8) of the card carriage 861 so that the left-hand edge of the card, provided with the aligning holes 983, is leading. Due to the acceleration and inertia imparted to the card, it travels in the receiving slot 976 of card carriage 861 until it reaches the stop 986 (Fig. 7) in the slot. Simultaneously, a starting pulse is passed to the stepping magnet AM through contact spoon 1553*a* of the motor-key monitor, connecting lead 1004 and contact spoon 610 of the card-evaluating monitor. Stepping magnet AM causes the evaluating monitor to advance into second switching position, and contact spoon 1550 then causes the stepping magnet MM to further advance the motor-key monitor into third position.

In the second position of the evaluating monitor, the starting pulse passes through lead 1005 to the clutch control magnet A*bt*M which releases the single-turn clutch of the scanner control shaft 601. Consequently, the scanner control shaft 601 is driven clockwise (Fig. 3) a single revolution. As a result, the roller 892 mounted on cam disc 602 (Figs. 3, 7) is turned out of the range of projection 891 on switching lever 890 so that lever 890, under the pulling force of spring 889, moves the coupling lever 893 upwardly (Fig. 3) out of its active position. Under the force of spring 882, the clamping levers 878 and 879 turn about their respective pivots 876 and 877 in clockwise and counter-clockwise direction respectively. The plunger pins 885, 886 enter into the aligning holes 983 of the account card 609 (Fig. 7) so that the account card is accurately aligned and firmly clamped in proper position relative to the feeler members 607 (Fig. 3) of the scanner assembly 600.

During the remaining amount of revolution of the scanner control shaft 601, the feeler members 607 are lowered onto the account card in the manner described above, whereby the account number, type of accounting and other symbols represented by the holes 987 in the head portion of the card 609 are scanned off and are transferred into the registering components of the machine. During this operation the identifying symbols, such as the account number, are automatically checked in a manner not further described herein. During checking operation a comparing mechanism receives the necessary voltage pulses through the contact spoon 1612*a* and lead 1006 of the card-evaluating monitor. If the comparison is positive, that is if the identification checked off the card is identical with the one posted into the machine, the lead 1006 remains connected to voltage and the card-clamping magnet KKM (Figs. 3, 12) is energized through the contact *k*1 closed by the clamping lever 878, and through lead 1007 (Fig. 12). Magnet KKM turns the coupling lever 893 into the inactive position shown in Fig. 3 so that the scanner control shaft 601, now again occupying its starting position, does not impose any effect upon the card-clamping device 878, 879 by the clockwise motion of lever 890 caused by the roller 892. Consequently, the account card remains firmly clamped in proper position within the card carriage 861.

Simultaneously with the operations last described, the contact spoon 1610*a* of the evaluating monitor applies voltage through lead 1008 to the control magnet ZSM (Fig. 11) which releases the single-turn clutch of the line-finder control shaft 971. Shaft 971 performs a single full revolution and thus, in the manner described above, causes scanning of the account card 609 for presence of any line holes. Since, in the example, the inserted account card 609 according to Fig. 7 possesses only one line of accounting entries, only the feeler member 995 (Figs. 7, 8) assigned to the first line encounters a line hole 974 so that only the contact piece 961/1 (Fig. 11) assigned to the first line is switched over.

Shortly before the scanner control shaft 601 completed its single-turn revolution above mentioned, it closed a contact *k*3 which passed a stop pulse to the stepping magnet AM of the evaluating monitor through lead 1009 (Fig. 12) and contact spoon 1610, so that the evaluating monitor was advanced into its third switching position.

In the third switching position of the evaluating monitor, the contact spoon 1612*a* applies voltage to the contacts 961/1 to 961/23 (Fig. 11). Simultaneously, a voltage pulse is supplied through contact spoon 1610*a* and lead 1011 (Fig. 12) to the carriage-travel control magnet KUM (Fig. 11).

Magnet KUM now releases the single-turn clutch of the carriage control shaft 867 (Fig. 6) which performs a single revolution. The cam disc 948 on control shaft 867 turns the swing lever 945 clockwise in opposition to the pull of spring 946. Pull rod 944 and gear segment 943 turn swing arm 926 and spur gear 925 clockwise about shaft 920. Since none of the switching magnets KAM, KLM and RAM are excited, the pawl 930, as it hits against the shoulder 942 of pawl 940, is turned counter-clockwise in opposition to the pull of spring 932 and thereby releases the switching pawl 929. Pawl 929 turns clockwise under the force of spring 931 until the pawl nose 935 abuts against ratchet gear 937. The switching pawl 929 then engages its nose 935 with the tooth 937*a* of ratchet gear 937 and entrains this gear clockwise during the residual motion of swing lever 945. The shaft 920 rigidly joined with gear 937 acts through spur gears 919, 914, 911 to shift rack member 900 (Fig. 3) of carriage 861 a few millimeters toward the left relative to Fig. 3. This reverse carriage travel permits the engaged stop pawl 906 to drop back into inactive position so that the rack member 900 and the card carriage 861 connected therewith are now freely movable.

During the next following counter-clockwise return stroke of swing lever 945 (Fig. 6) effected by cam disc 948, the spring 946 pulls the rod 944 toward the right relative to Fig. 6 so that gear segment 943 now drives the swing arm 926 counter-clockwise. By action of the carriage-driving spring mechanism 912 (Figs. 3, 6, 7) the spur gears 911, 914, 915 turn counter-clockwise and drive the spur gears 916, 919, 921 clockwise. Spur gear 911, meshing with the rack teeth 909 of rack member 900, displaces this member and hence also the card carriage 861 under the effect of the driving spring mechanism 912 toward the right (Fig. 3). These movements take place in proportion to the return motion of swing arm 926. The spur gears 916, 923 while thus being rotated, drive the contact arms 987, 987*a* (Fig. 11) of the carriage travel selector KWW and the contact arms 988, 988*a* of the line selector ZW in the clockwise direction so that these arms pass over the appertaining stationary bank of contacts. Each bank contact of the line selector ZW corresponds to one of the respective lines on the account card 609. All odd line-numbers 1, 3, 5, . . . are assigned to one contact path, and all even line-numbers 0, 2, 4, 6, . . . to a second contact path as is shown in Fig. 11. Leads 1100 to 1103 connect the respective bank contacts of line selector ZW with the corresponding switch contacts 961/1 to 961/23 of the line finder, only some of the connecting leads being illustrated in Fig. 11.

It will be remembered that in the third switching position of the evaluating monitor (Fig. 12) the contacts 961/1 to 961/23 of the line finder are connected to voltage through the lead 1010. Since the account card 609 (Fig. 7) here exemplified possesses only one line of hole entries 974 so that accordingly only the contact 961/1 (Fig. 11) is switched over, the following circuit is formed for arresting the card carriage 861: plus pole, contact spoon 1610*a* (Fig. 12) of the evaluating monitor, lead 1010, the contacts 961/23 to 961/2 (Fig. 11) which remain in the normal position, the reversed contact 961/1, lead 1101, contact arm 988 of line selector ZW, lead 1141, contact *u*3 of reversing relay UR, leads 1143, 1145, stop magnet S*t*M2, minus pole. Stop magnet S*t*M2 is energized and turns the appertaining stop pawl 907 (Fig. 3) into the stop teeth 902 of rack member 900 on card carriage 861, thus stopping the card carriage 861.

Simultaneously, the closing of contact *u*3 in relay UR also applies voltage to a time-delay relay VR2 (Fig. 11) which closes its contact *v*2 thus completing a self-sealing circuit through the lead 1147 and the contact *k*2 which became closed by cam 867*b* during rotation of the carriage control shaft 867. The just-mentioned self-sealing circuit through contact *v*2 prolongs the duration of the energizing pulse applied to the stop magnet S*t*M2 and initiated by the only short-lasting pulse produced by the line finder.

The reversing relay UR (Fig. 11) receives a voltage pulse through the lead 1149, contact *u*1, lead 1151, contact ZK which is closed by the cam 989 of contact arm 988, and lead 1153. Relay UR now switches its contacts *u*1 to *u*4 to establish connection with respective leads 1157, 1159, 1155 and 1160. Relay UR is of the type which requires an energizing pulse for each change in contact position. That is, the relay UR has a mechanical switching member so that the contacts *u*1 to *u*4, once placed into a given position, retain this position until a new switching pulse is applied.

Shortly before the swing arm 926 completes its return movement into the starting position shown in Fig. 6, the switching pawl 929, now turned to active position, abuts against lug 936*a* of stationary stop 936 and is thereby turned counter-clockwise about its pivot 927 in opposition to the force of spring 931 into the position illustrated at Fig. 6. During this motion, the pawl 930, biased by spring 932, also returns to the normal position and then latches the switching pawl 929 by means of the projection 934 entering beneath the lug 933.

The account card 609, clamped onto the card carriage, has now its last entered line located beneath the feeler members 607 of the scanner 600. The scanner control magnet A*bt*M is energized through contact spoon 1611*a* (Fig. 12) and lead 1005. Since the card carriage 861 has moved away from its starting position, the contact *k*1 opens the holding circuit of the card-clamping magnet KKM (Fig. 12) so that the coupling lever 893 turns back into its active position.

Upon completion of the individual operations described so far, the card carriage has placed the accounting card into a position wherein the last-entered line of holes is located beneath the feeler members of the scanner. However, before continuing the description of the subsequent operation, it will be helpful to first consider the particular wiring of the line finder illustrated in Fig. 11. The wiring is such that if another card transport took place and shifted the card into an odd line position, for instance to line "3," then a switching pulse would be supplied to the stop magnet S*t*M1 through the lead 1103, contact arm 988, lead 1141, reversed contact *u*3, and leads 1155, 1154, 1144. The time-delay relay VR1, which responds at the same time, would maintain the switching pulse for an additional interval of time, while another switching pulse is applied to reversing relay UR through leads 1144, 1157, reversed contact *u*1, lead 1151, closed contact ZK, and lead 1153, so that relay UR would switch its contacts *u*1 to *u*4 back into the position shown in Fig. 11.

However, if the account card is transported into an even line position, for instance to the line "2," then the stop pulse passes through lead 1102 (Fig. 11), contact arm 988*a*, lead 1142, contact *u*2, and leads 1154 and 1144 to the stop magnet S*t*M1. At this time the lead 1151 and thus the reversing relay UR do not receive voltage because the contact *u*1 remains in the position shown in Fig. 11. Reversing of contacts *u*1 to *u*4 does not take place. When a subsequent transportation of the card into an even line position occurs, the same circuits will be closed without the reversing relay UR being energized.

Consequently, when the card is positioned to an odd-numbered line, the stop magnet S*t*M1 and the stop magnet S*t*M2 are alternately called upon to operate by means of the reversing relay UR, whereas when the card is positioned to an even-numbered line only the stop magnet S*t*M1 is energized. Likewise, the contacts *u*1 to *u*4 are not reversed, and hence no change between stop magnets StM1 and StM2 takes place, when the account card is shifted from an even line number to an odd line number and vice versa. Therefore, when the card carriage 861 has reached the last, namely the twentythird, line position which is an odd line, and when, as a result, the relay UR is energized through lead 1123 (Fig. 11), contact arm 988, lead 1141, contact *u*3, leads 1143 and 1149, contact *u*1, lead 1151, contact ZK and lead 1153, then the contacts *u*1 to *u*4 are reversed, and a reversing pulse, produced by the carriage selector KWW in a manner still to be described, is passed through lead 1160 and the reversed contact *u*4 to the reversing relay UR so that it returns its contacts *u*1 to *u*4 into the original position shown in Fig. 11. Consequently, the card carriage 861 can again be arrested in the programmed manner by the above-described respective stop control circuits in any line of the card scanned by the line finder. As already mentioned, this circuitry, in conjunction with the stop teeth 902 of the rack member 900 connected with the card carriage 861 secures reliable switching intervals while operating with extremely fast traveling motion of the card carriage.

Reverting now to the description of a continuous operating sequence, it will be remembered that at the end of the individual operations so far described the account card 609 had its last entered line placed beneath the feeler members 607 of the scanner 600. The scanner is now effective to scan the old balance off the card and entering it into the accounting machine. In the meantime the attendant has posted into the keyboard of the machine the data and control commands required for the accounting operation. These steps of operation do not form part of the essential features of the invention and are mentioned only for the sake of completeness (although, if desired, reference may be had to the copending application Serial No. 624,241 mentioned above). As already described, the scanner control shaft 601, shortly prior to terminating its revolution, produces a stop pulse. This pulse is applied through lead 1009 (Fig. 12, upper left) and contact spoon 1610 of the evaluating monitor to the stepping magnet AM which causes the evaluating monitor to advance to its fourth switching position, whereafter the same stepping magnet AM is energized from its own plus pole through contact spoon 1612 to further advance the monitor into zero position.

The card carriage 861 is now shifted to transfer the account card into printing position. The printing line 816 (Fig. 3) is located twenty-nine lines in the conveying direction away from the scanning position. Consequently, the card carriage must be shifted in the conveying direction a distance equal to the spacing of thirty lines in order to place the new accounting line on the card, that is the line 2 in the chosen example, into the printing position.

For entering the posted accounting data into the machine, the attendant had to again depress the motor key MT which passes a pulse through lead 1002 (Fig. 12), contact spoon 1551 and lead 1013 to the stepping magnet MM of the motor-key monitor. The responding magnet MM causes the motor-key monitor to advance into its fourth switching position. Now the carriage control magnet KUM (Fig. 11) receives voltage through contact spoon 1551*a* of the motor-key monitor and lead 1011 (Figs. 12, 11), while the contact spoon 1554*a* (Fig. 12) passes a switching pulse to the stepping magnet BM of the discriminating monitor through lead 1014 and contact spoon 1660. Stepping magnet BM advances the discriminating monitor into second position. The stepping magnet MM of the motor-key monitor receives a switching pulse through the contact spoon 1552 and advances the motor-key monitor from fourth position to starting position.

The just-mentioned excitation of the carriage control magnet KUM (Figs. 11, 5) again initiates a single-turn revolution of the carriage control shaft 867. During this revolution, the cam disc 948 (Fig. 6) turns the swing lever 945 clockwise and thus drives, through pull rod 944 and gear segment 943, the swing arm 926 in clockwise direction. Since again none of the control magnets KAM, ALM, RAM is energized at this time, the switching pawl 929 is placed into engagement with ratchet gear 937 by means of recess 942 in switching pawl 940. The excessive stroke motion thus produced by shaft 920 and spur gears 919, 914, 911 releases the rack member 900 (Fig. 3) of the carriage so that stop pawl 907 turns back into its inactive position. During the reversal in motion of swing arm 945, the spring mechanism 912 is effective to drive the carriage in the forward conveying direction (to the right in Fig. 3) in proportion to the return movement of swing arm 926. This has the effect that spur gears 911, 915 drive the carriage travel selector KWW, and spur gears 911, 914, 919, 921 drive the spur gear 923 of the line selector ZW, both rotating clockwise. As soon as the contact arm 988*a* (Fig. 11) enters into electric engagement with the stationary bank contact assigned to the thirtieth line, a voltage pulse is applied to the stop magnet StM2 through the contact spoon 1660*a* (Fig. 12) of the discriminating monitor now in its second position, lead 1130, contact arm 988*a* (Fig. 11), lead 1142, reversed contact *u*2, and lead 1159. The energized stop magnet StM2 places its stop pawl 903 (Fig. 3) into engagement with the stop teeth 902 of rack member 900 and thus terminates the conveying travel of card carriage 861.

The account card 609 (Fig. 7) has now its second accounting line located on the printing line 816 (Fig. 3) and can be imprinted with the new balance which, in the meantime, has been calculated by the machine, and with any accounting legends or symbols posted by the attendant into the keyboard of the machine. The manner in which this printing is effected is not further described herein because not essential to the invention, although reference may be had, if desired, to the above-mentioned copending application Serial No. 624,241. The printing mechanism is caused to operate at the proper time by excitation of the appertaining clutch-control magnet UDrM (Fig. 12) through lead 1022 and contact spoon 1663*a* of the discriminating monitor now in second position. At the same time the calculated and posted data are printed on a ledger or journal sheet by the upper printing assembly 200 (Fig. 1). The printer control shaft 828 (Fig. 12) produces a stop pulse by closing the contact *k*4 shortly before terminating its single-turn revolution, in the same manner as described above with reference to the scanner control shaft 601. The stop pulse produced by the closing of contact *k*4 is supplied through lead 1015 and contact spoon 1660 of the discriminating monitor to the stepping magnet BM which causes the same monitor to advance into third position.

After the desired data are printed upon the account card, the card is conveyed to the punching position.

The punching plungers 868 (Fig. 3) for producing code holes in the account card are located fourteen lines ahead of the printing line 816 of the printer assembly 800. Hence the account card must be conveyed fourteen lines in the reverse direction (to the left in Fig. 3). For this purpose the discriminating monitor, now in third position, again calls upon the carriage travel control magnet KUM (Fig. 11) by supplying it with energizing voltage from the plus pole of the discriminating monitor through contact spoon 1661*a* (Fig. 12) and lead 1011 (Figs. 12, 11). The carriage control shaft 867 performs a single-turn revolution and drives the swing arm 926 (Fig. 6) clockwise in the manner already described. However, since the control magnet ALM (Fig. 11) is energized through contact spoon 1663*a* (Fig. 12) of the discriminating monitor now in third position, and through the lead 1016 (Figs. 12, 11), the magnet ALM has turned its switching pawl 939 (Fig. 6) into the range of the pawl 930. As a result, the latch pawl 929 of the swing arm 926 engages the ratchet gear 932 at an early moment of operation.

The motion of swing arm 926 in clockwise direction is thus transferred to the ratchet gear 937, so that this gear, acting through shaft 920 and spur gears 919, 914, 911, shifts the rack member 900 and the card carriage 861 to the left relative to the illustration in Fig. 3. This also has the simultaneous effect of winding up the spring mechanism 912 mounted on shaft 910. The stop magnet S*t*M2 is again energized through contact spoon 1662*a* (Fig. 12) of the discriminating monitor, lead 1100, contact arm 988*a* (Fig. 11), lead 1142, reversed contact *u*2, and lead 1159. Stop magnet S*t*M2 turns its stop pawl into the range of the stop teeth 902 on rack member 900 with the result of arresting the carriage in the desired punching position. Now the puncher control magnet L*o*M is energized through contact spoon 1664*a* and lead 1023 and releases a single-turn revolution of the puncher control shaft 650.

By operation of the puncher control shaft 650 the calculated new balance is punched into the accounting card, and the second line of the card receives corresponding code holes. Shortly before the puncher control shaft 650 completes its revolution, a cam mounted on shaft 650 actuates a contact *k*5 (Fig. 12) and produces a stop pulse. This pulse is applied through lead 1024 to the stepping magnet BM of the discriminating monitor. Stepping magnet BM first switches the discriminating monitor into fourth position and thereafter, being energized through contact spoon 1662 and the plus pole of the monitor, again advances the same monitor so that it returns to the zero position.

While this is taking place, the contact spoon 1661*a* of the discriminating monitor passes another switching pulse to the carriage travel control magnet KUM. Simultaneously, contact spoon 1661*a* of the evaluating monitor (Figs. 12, 11) passes a switching pulse through lead 1018 to the magnet KAM which turns its switching pawl 938 into the range of projection 945 on pawl 930. During the clockwise motion of swing arm 945, released by control magnet KUM, the pull rod 944 turns the swing arm 926 clockwise as described, and the pawl 930 (Fig. 6) abuts against the switching pawl 938, so that the spring-biased switching pawl 929 of swing arm 926 is immediately placed into engagement with ratchet gear 937 which has been moving in counter-clockwise direction. The entire winding-up motion of swing lever 945 is thus transmitted through ratchet gear 937, shaft 920 and spur gears 919, 914, 911 to the rack member 900 (Fig. 3) and hence also to the card carriage 861. Simultaneously, the spur gears 911 (Figs. 3, 6) and 915 again drive the spur gear 916 of the carriage selector KWW, while the spur gears 911, 914, 919, 921 drive the spur gear 923 of the line selector ZW. As soon as the contact arm 987 of selector KWW (Fig. 11) reaches the stationary bank contact assigned to the line "0," a switching pulse passes through lead 1019 to the stop magnet S*t*M1 which then stops the card carriage. Simultaneously, a pulse passes from lead 1019 through lead 1160, reversed contact *u*4 and lead 1153 to the reversing relay UR so that relay UR switches its contacts *u*1 to *u*4 back into the original position illustrated in Fig. 11.

The above-described operation of the single-turn clutch 984 (Fig. 9) for the shaft 974 carrying the feed roller 975 (Fig. 7) is controlled by a clutch control magnet ABM (Fig. 12). This magnet becomes energized through contact spoon 1662*a* of the discriminating monitor and lead 1020 so that now the feed roller 975 is operated to run in the clockwise direction.

As explained above, when the card carirage 861 commences to travel toward the right from the starting position shown in Fig. 3, the contact *k*1 (Figs. 3, 11) is opened so that the card clamping magnet KKM (Figs. 3, 12) is deenergized and permits the coupling lever 893 to turn into active position. When now the carriage, near the end of the described performance, is returned, as described above, to the starting position shown in Fig. 3, then the pin 895 fastened to the clamping lever 878 engages the recess 894 of clamping lever 893. As a result, the clamping lever 878 is turned counterclockwise about its pivot 876 shortly before the carriage terminates the winding-up travel. Due to the pin-and-slot connection 891, the clamping lever 879 is simultaneously turned into inactive position so that the plunger pins 885, 886 move downward (Fig. 3) and release the account card 609 from card carriage 861. During the excessive stroke motion of the carriage 861 occurring shortly before the swing lever 945 reverses its motion, as already described, the account card is now seized by the feed roller 975 whose shaft 974 (Fig. 9) now rotates clockwise, and is removed from the carriage assembly of the machine.

When this operation is completed, all previously moved machine components again occupy their respective starting positions. The monitoring selector switches illustrated in Fig. 12 are likewise all advanced to their zero position so that a new accounting operation can be performed.

Certain accounting operations make it desirable to scan an account card, located in the card carriage 861, in reverse order commencing with line "23" and ending with line "1." An example of such operation is the accounting and registering of amounts of interest. For such purposes, the machine is provided with the above-mentioned control magnet RAM (Figs. 3, 11). When magnet RAM is excited, it moves its pawl 940 (Fig. 6) into the range of the pawl 930 pivoted on swing arm 926. As a result, the switching pawl 929, likewise mounted on swing arm 926, is caused, by abutment of pawl 930 against pawl 940, to enter into engagement with ratchet gear 927 at a location one line ahead of the point of engagement obtaining during normal operation. Consequently, when the carriage travel control shaft 867 performs a single revolution by release of the appertaining single-turn clutch, the card carriage 861 can be moved by the above-described transmission gearings one line in the reverse direction from any desired line position. The stop pulse for the rack member 900 in this case is again transmitted through lead 1100 by a monitor of the described selector-switch type to one of the magnets S*t*M1 and S*t*M2.

By virtue of the carriage control system according to the invention, the carriage 861 can be moved into any desired accounting line in the conveying direction as well as in the opposite direction regardless of whether the conveying travel commences from the starting position of the card carriage or any other stop position determined by the line finder. By means of the line selector ZW, driven synchronously from the card carriage, any desired impulse leads, of which in the present examples only the leads 1100 and 1130 are shown, can be selected for controlling the carriage stopping magnets S*t*M1, S*t*M2 in any desired additional manner as determined by programming monitor switches (FW, Figs. 10, 12). The carriage travel selector KWW, synchronously driven from the card carriage 861, also serves to control by its impulse leads, such as the lead 1019 (Fig. 11), the magnets S*t*M1, S*t*M2 to discontinue the traveling motion of the card carriage. By means of additional impulse leads (not illustrated) controlled by the carriage travel selector KWW, which can be connected by the above-mentioned programming monitor FW in a predetermined manner with additional monitor devices similar to the evaluating and discriminating monitors (see, for instance, the leads 1004, 1014), a multiplicity of other control operations can be performed, such as the operation of a transfer or carry-over mechanism which is to become effective when the account card is fully occupied by lines of entry, or the operation of a totalizer switching mechanism for the release of stack accounting, i.e. a series of accountings all relating to one and the same account. Furthermore, in a complete and more comprehensive accounting machinery, the calling of the switching magnet KUM for controlling the carriage control shaft 867 can preferably be effected directly by means of the contacts *k*3, *k*5 (Fig. 12) of the scanner shaft 601 and puncher control shaft 650 respectively. By providing additional switching magnets for controlling the motion of swing arm 926, the traveling motion of carriage 861 can be given any desired length in one and the other direction as may be desired.

A machine provided with card-carriage control means according to the invention therefore not only affords extremely great accounting speeds but also permits the performance of complicated accounting problems heretofore possible only when using individual-item account cards.

It will be obvious to those skilled in the art, upon a study of this disclosure, that our invention permits of various modifications and alterations with respect to the individual components and circuits of the machine, and hence can be embodied in equipment other than particularly illustrated and described herein, without departing from the essential features of our invention and within the scope of the claims annexed hereto.

We claim:

1. With an accounting machine for data-carrying account cards with a multiplicity of data-entry lines, said machine having card-scanning, card-punching and card-printing assemblies located one behind the other, the combination of card-conveying apparatus comprising guide means defining a card travel path along said respective assemblies, a card-feeding table and a card-return table, a card-holding carriage movable on said guide means for conveying the card on said path, reversible drive means connected with said carriage for displacing it in either direction along said guide means, stop means engageable with said carriage in a given multiplicity of stop positions spaced from each other a distance equal to the line spacing on the card for arresting said carriage in said respective stop positions, and selective control means connected with said stop means and with said drive means for causing said carriage to be displaced a selected distance in a selected direction, whereby the card is automatically shifted from any position previously occupied to any desired position relative to one of said respective assemblies, and means for automatically conveying said card from said carriage to said card-return table.

2. With an accounting machine for data-carrying account cards with a multiplicity of data-entry lines, said machine having card-scanning, card-punching and card-printing assemblies located one behind the other, the combination of card conveying apparatus comprising guide means defining a card travel path along said respective assemblies a card-feeding table and a card-return table, a card-holding carriage movable on said guide means for conveying the card on said path, reversible drive means connected with said carriage for displacing it in either direction along said guide means, stop means engageable with said carriage in a given multiplicity of stop positions spaced from each other a distance equal to the line spacing of the card for arrested said carriage in said respective stop positions, selective drive control means connected with said reversible drive means for causing it to operate in a selected direction, selective stop control means connected with said stop means for causing it to operate at a selected point of carriage travel, and programming means connected with said drive control means and said stop control means for actuating them in selective correlation, whereby the card is automatically shifted from any line position to any selected other line position relative to any one of said assemblies.

3. With an accounting machine for data-carrying account cards with a multiplicity of data-entry lines, said machine having card-scanning, card-punching and card-printing assemblies located one behind the other, the combination of card-conveying apparatus comprising straight guide means defining a linear path, a card-holding carriage movable on said guide means for conveying the card on said path, rack means on said carriage having respective rows of rack teeth and stop teeth both parallel to said path, said stop teeth having a tooth spacing adapted to the line spacing of the card, stop means engageable with said stop teeth for arresting said carriage in a multiplicity of respective positions to place any one of the card lines into registry with any one of said assemblies, reversible drive means having a spur gear meshing with said rack teeth for displacing said carriage in either direction, and selective control means connected with said stop means and with said drive means for causing said carriage to be displaced a selected distance in a selected direction, whereby the card is automatically shifted from any position previously occupied to any desired position relative to one of said respective assemblies.

4. With an accounting machine for data-carrying account cards with a multiplicity of data-entry lines, said machine having card-scanning, card-punching and card-printing assemblies located one behind the other, the combination of card-conveying apparatus comprising guide means defining a card travel path along said respective assemblies, a card-holding carriage movable on said guide means for conveying the card on said path, drive means for displacing said carriage in either direction along said guide means, said drive means comprising a reciprocating drive member movable forward from a start position to an end position and back to said start position during each cycle of operation, gear means of reversible rotation in driving engagement with said carriage and controllable by said drive member for rotation in a direction dependent upon a selected stroke direction of said member, drive control means operatively connected with said drive means for causing rotation of said gear means during said stroke direction whereby said carriage is displaced in a selected direction, selective stop control means connected with said stop means for causing it to operate at a selected point of carriage travel, and programming means connected with said drive control means and said stop control means for actuating them in selective correlation, whereby the card is automatically shifted from any line position to any selected other line position relative to a selected one of said assemblies.

5. With an accounting machine for data-carrying account cards with a multiplicity of data-entry lines, said machine having card-scanning, card-punching and card-printing assemblies located one behind the other, the combination of card-conveying apparatus comprising guide means defining a card travel path along said respective assemblies, a card-holding carriage movable on said guide means for conveying the card on said path, reversible drive means for displacing said carriage along said guide means, stop means engageable with said carriage in a given multiplicity of stop positions spaced from each other a distance equal to the line spacing on the card for arresting said carriage in said respective stop positions, selective control means connected with said stop means and with said drive means for causing said carriage to be displaced a selected distance in a selected direction, said drive means comprising a reversibly rotatable transmission member operably connected with said carriage for driving the latter, an oscillating member having a forward stroke and a return stroke during each cycle of operation, a follow-up mechanism comprising said transmission member and a driving spring device tending to turn said transmission member in a given direction for displacement of said carriage in a corresponding direction, coupling means mounted on said oscillating member to partake in said strokes and connecting said oscillating member with said spring device during one of said strokes so as to tension said spring device whereby said follow-up mechanism is effective to thereafter displace said carriage in the opposite direction by force of the tensioned spring device, and selectively operable switching means engageable with said coupling means at respectively different travel points of said oscillating member for disconnecting it from said spring device whereby the wind-up travel of said spring device is divided into selectively different lengths.

6. In card-conveying apparatus according to claim 5, said selective control means for said stop means comprising a line finder device located along said travel path and having electric contact means responsive to occurrence of hole entries in the account card on said carriage, said stop means having electromagnet means connected with said line-finder contact means for stopping said wind-up travel.

7. In card-conveying apparatus according to claim 5, said drive means comprising a control shaft, a reciprocatory connection between said shaft and said oscillating member for driving said latter member from said shaft, said oscillating member having a pivot shaft and being rotatable thereupon, a ratchet gear mounted on said pivot shaft in coaxial relation to said oscillating member and having a row of ratchet teeth along part of its periphery; said coupling means comprising a pawl pivotally mounted on said oscillating member and engageable with said ratchet teeth during a given stroke movement of said oscillating member to then entrain said ratchet gear when engaging said teeth; a gear transmission forming a constrained driving connection between said ratchet gear and said transmission member, said latter member being firmly joined with said spring device; and said switching means having respective controllable stops located at said travel points for selectively disengaging said pawl, whereby the winding-up movement of said carriage, derived from said control shaft, is selectively effective in entirety and in part respectively.

8. In card-conveying apparatus according to claim 5, said drive means comprising a main shaft continuously revolving when the apparatus is in operative condition, a single-turn clutch connected with said shaft and having releasing means for deriving a single-turn revolution from said shaft, a rotatable spur gear segment meshing with said oscillating member for imparting thereto said forward and return strokes, and a cam mechanism joined with said clutch and linked to said gear segment, whereby during one of said strokes said spring device is tensioned to store driving power which, upon stroke reversal, causes follow-up displacement of said carriage.

9. In card-conveying apparatus according to claim 1, said stop means comprising two stop pawls and stop control magnets controlling said respective pawls, said two pawls being spaced from each other a distance equal to an odd number of line spacings on the card for selectively arresting said carriage in an even-numbered and odd-numbered line position depending upon which of said magnets is energized at a time; a line selector having a selector travel synchronous with the carriage travel so as to have at any time a setting indicative of the line position of the card; a line finder device located along said path and having electric contact means responsive to occurrence of the first vacant, i.e. non-perforated, line on the card, energizing circuit means alternately connected to said respective magnets under control by said line selector and line-finder device and comprising a reversing relay device controlled by said line selector and having reversing relay contacts electrically connected between said respective magnets and said line selector for exchanging the supply of energizing voltage between said respective magnets when said carriage is displaced into an odd line position, whereby during a next following carriage displacement by an odd number of line positions the previously idle magnet is energized through said line selector.

10. In card-conveying apparatus according to claim 9, said line finder having a number of electric contacts responsive to the respective entry lines on the card, said line selector having respective bank contacts individually connected with said respective line-finder contacts and having movable contact means electrically connected through said relay contacts with said magnets and mechanically connected with said carriage so as to travel from a zero position to an end position during each travel of said carriage.

11. In card-conveying apparatus according to claim 10, a carriage-travel selector switch having movable contact means synchronously driven from said carriage and having bank contacts sequentially engaged by said latter movable contact means in dependence upon the travel position occupied by said carriage at a time, an energizing electric connection connecting said reversing relay device with said travel selector switch when said latter selector switch is in starting position, whereby said exchange of energizing voltage occurring between said two stop control magnets when said carriage returns from an odd line position to zero is again reversed by said relay device as said travel selector switch returns to starting position together with said carriage.

12. In card-conveying apparatus according to claim 11, a discriminating monitor device operable in accordance with a desired program, and energizing leads connecting said monitor device in selected positions thereof with said respective bank contacts of said line selector for causing said stop control magnets to be energized independently of said line finder device, whereby said monitor device permits arresting said carriage in any desired line position other than the arresting position determined by sad line finder device.

13. In card-conveying apparatus according to claim 9, electric time-delay means connected with said stop control magnets and with said energizing circuit means for prolonging the energizing pulse, initiated by said line finder device and applied to said stop control magnets, until one of said respective stop control magnets has placed its stop pawl into carriage-arresting engagement.

14. In card-conveying apparatus according to claim 3, said stop teeth of said rack member having a tooth spacing equal to twice the line spacing on the card, and said stop means having two stop pawls engageable with said stop teeth and spaced from each other an odd number of line spacings, and respective stop control magnets for operating said stop pawls, said selective control means being electrically connected with said control magnets.

15. In card-conveying apparatus according to claim 1, said carriage comprising a card-holding mechanism having two pivoted clamping levers jointly movable between inactive and active card-fastening position, a spring means engaging said holding mechanism and biasing said two levers to said active fastening position, a latch engageable with said holding mechanism for securing it in said inactive position, and a control magnet connected with said latch for controlling it to respectively release and latch said holding mechanism.

16. In card-conveying apparatus according to claim 15, each of said clamping levers having a card-aligning pin, said pins being engageable with respective holes of the card to be fastened and movable through said card holes when said respective levers pass from inactive to active position, whereby said pins align the fastened card relative to said assemblies.

17. In card-conveying apparatus according to claim 1, said selective control means comprising a line finder device having a multiplicity of feeler pins engageable with the card on said carriage at the respective entry lines of the card, a feeler shaft, a multiplicity of feeler levers coaxially pivoted on said feeler shaft, each of said levers having one end linked to one of said respective feeler pins, switching members pivoted on said feeler shaft, elastically yieldable coupling means connecting each switching member with one of said respective feeler levers whereby each of said switching members is caused to follow the hole-engaging motion of the one appertaining feeler pin, and respective electric contact means actuable by said switching members for controlling the carriage travel.

18. In card-conveying apparatus according to claim 17, said line finder device comprising a reciprocating driving mechanism common to and engageable with all said switching members during its forward stroke for setting all switching members to zero position, whereby said coupling means are effective to move said feeler levers to shift said feeler pins toward the card.

19. In card-conveying apparatus according to claim 18, said reciprocating driving mechanism of said line finder device comprising a bar moving forward and back in a direction transverse to the longitudinal direction of said bar, said bar being straddled by said feeler levers on the one hand and said switching members on the other hand; each of said coupling means having a coupling lever pivoted on said feeler lever and engaging said bar on the same bar side as said switching member, said coupling lever having pawl means engaging said switching member during the forward stroke of said bar and having a spring joining said coupling lever with said feeler lever to urge both against said bar; whereby said bar during its forward stroke positively entrains said switching members and sets said electric contact means into zero position while resiliently entraining said feeler levers and feeler pins through said springs to pass said feeler pins through any encountered card holes whereas the feeler pins not encountering a hole are stopped by the card to thereby release said pawl means, and whereby said bar during its return stroke actuates only the switching members and contact means whose respective feeler pins have passed through such holes.

References Cited in the file of this patent

UNITED STATES PATENTS

| | | |
|---|---|---|
| 936,108 | Ford | Oct. 5, 1909 |
| 1,131,836 | Heywood and Travis | Mar. 16, 1915 |
| 1,754,955 | Kruse | Apr. 15, 1930 |
| 2,154,485 | Belluche | Apr. 18, 1939 |
| 2,278,118 | Pitman | Mar. 31, 1942 |
| 2,825,561 | Sobisch | Mar. 4, 1958 |